United States Patent
Funane

(10) Patent No.: US 11,477,191 B2
(45) Date of Patent: *Oct. 18, 2022

(54) SYSTEM, CONTROL METHOD FOR SYSTEM, VOICE OPERATION DEVICE, CONTROL METHOD FOR VOICE OPERATION DEVICE, AND STORAGE MEDIUM

(71) Applicant: CANON KABUSHIKI KAISHA, Tokyo (JP)

(72) Inventor: Nao Funane, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 332 days.

This patent is subject to a terminal disclaimer.

(21) Appl. No.: 16/142,460

(22) Filed: Sep. 26, 2018

(65) Prior Publication Data

US 2019/0109847 A1    Apr. 11, 2019

(30) Foreign Application Priority Data

Oct. 10, 2017    (JP) .............................. JP2017-197216

(51) Int. Cl.
*G06F 21/00*    (2013.01)
*H04L 9/40*    (2022.01)
(Continued)

(52) U.S. Cl.
CPC ........ *H04L 63/0861* (2013.01); *H04L 9/3073* (2013.01); *H04L 9/3231* (2013.01);
(Continued)

(58) Field of Classification Search
CPC . H04L 63/0861; H04L 9/3073; H04L 9/3231; H04L 9/3247; H04L 63/0823;
(Continued)

(56) References Cited

U.S. PATENT DOCUMENTS

2010/0281520 A1*  11/2010  Deguchi ................ G06Q 10/10
                                                        726/3
2014/0223518 A1*  8/2014  Feng .................... H04L 63/0892
                                                        726/4
(Continued)

FOREIGN PATENT DOCUMENTS

CN    101719248 A    6/2010
CN    105959287 A    9/2016
(Continued)

OTHER PUBLICATIONS

Office Action issued in Japanese Appln. No. 2017-197216 dated Jul. 6, 2021. English translation provided.
(Continued)

*Primary Examiner* — Shewaye Gelagay
*Assistant Examiner* — Michael M Lee
(74) *Attorney, Agent, or Firm* — Rossi, Kimms & McDowell LLP

(57) ABSTRACT

A system including a mobile terminal having an authenticator, a TPM with tamper resistance and a voice assistant. The voice assistant makes a process request corresponding to voice input of a user to a server in accordance with the input, receives a biometric authentication request from the server, makes a request for a biometric authentication process to the mobile terminal of the user in accordance with the request for biometric authentication via wireless communication, and transmits an authentication result from the mobile terminal to a server. The mobile terminal executes the biometric authentication process using biometric information stored in the authenticator and the TPM in accordance with the request for the biometric authentication process from the voice assistant, and transmits an authentication result to the voice assistant.

13 Claims, 13 Drawing Sheets

(51) Int. Cl.
*H04L 9/32* (2006.01)
*H04L 9/30* (2006.01)
*H04W 12/06* (2021.01)

(52) U.S. Cl.
CPC ........ *H04L 9/3247* (2013.01); *H04L 63/0823* (2013.01); *H04W 12/06* (2013.01); *H04L 2463/081* (2013.01); *H04L 2463/102* (2013.01)

(58) Field of Classification Search
CPC ....... H04L 2463/081; H04L 2463/102; H04W 12/06
See application file for complete search history.

(56) References Cited

U.S. PATENT DOCUMENTS

| | | | |
|---|---|---|---|
| 2016/0224774 A1* | 8/2016 | Pender | G06Q 20/10 |
| 2016/0262017 A1 | 9/2016 | Lavee | |
| 2017/0004296 A1* | 1/2017 | Toiyama | H04W 12/065 |
| 2017/0263249 A1* | 9/2017 | Akbacak | G10L 15/24 |
| 2018/0005630 A1* | 1/2018 | May | G06Q 20/20 |
| 2018/0039990 A1* | 2/2018 | Lindemann | G06F 21/31 |
| 2019/0156856 A1* | 5/2019 | James | G06F 21/32 |

FOREIGN PATENT DOCUMENTS

| | | |
|---|---|---|
| DE | 202016008226 U1 | 6/2017 |
| JP | 2003132435 A | 5/2003 |
| JP | 2009176171 A | 8/2009 |
| JP | 2011512580 A | 4/2011 |
| JP | 2012022517 A | 2/2012 |
| JP | 2017060097 A | 3/2017 |
| JP | 2017084235 A | 5/2017 |
| JP | 2017175244 A | 9/2017 |
| KR | 101198120 B1 | 11/2012 |
| WO | 2015146178 A1 | 10/2015 |

OTHER PUBLICATIONS

Office Action issued in Chinese Appln. No. 201811175067.3 dated Apr. 22, 2021. English translation provided.

Office Action issued in Korean Appln. No. 10-2018-0118629 dated May 15, 2021. English translation provided.

* cited by examiner

SYSTEM, CONTROL METHOD FOR SYSTEM, VOICE OPERATION DEVICE, CONTROL METHOD FOR VOICE OPERATION DEVICE, AND STORAGE MEDIUM

BACKGROUND OF THE INVENTION

Field of the Invention

The present invention relates to a system that provides a secure authentication method and improves user convenience.

Description of the Related Art

In recent years, Fast Identity Online (FIDO) has gained attention as a new system for authentication including biometric authentication. Unlike passwords used in ID/password authentication of the related art, when biometric information such as fingerprints and veins that are used for biometric authentication is leaked to the outside once, it is not possible to rewrite the biometric information, and therefore information leakage is disastrous.

On the other hand, FIDO causes a registration process to be performed between a device at the hand of a user and a server providing a web service in advance. In the registration process, a secret key associated with biometric information of the user is saved in the device, and information such as authentication identification information associated with the biometric information and a public key paired with the secret key are registered in the server. In addition, authentication is performed on the device at the hand of the user, rather than being performed on the server via the Internet, and the authentication result signed with the secret key runs on the network. That is, since the biometric information does not circulate on the network, it can be said that the risk of information leakage is low.

Meanwhile, voice assistant devices (voice operation devices) having a speaker function have been generally used in recent years. Such a voice assistant device will be referred to as a voice assistant below. A voice assistant is an information apparatus with functions of interpreting speech of users using a voice recognition function and executing various instructions from users. Since such a voice assistant can be commanded by voice, it is advantageous in that the effort of key operations and touch input necessary for conventional personal computers and smartphones can be saved.

As an example of a use method of a voice assistant, a voice assistant is installed in a living room of a house or the like, and a user can play desired music by giving an instruction with his or her voice or can order a product in a telemarketing service run on the Internet. In addition, such voice assistants have been actively introduced not only in households but also in public facilities including accommodation facilities such as hotels.

In general, accommodation facilities such as hotels provide comprehensive services such as search for events and purchase of tickets for their guests, and the like, as well as room service. Voice assistants are expected to be means for guests to easily receive services when the services are provided, without requiring troublesome work.

JP 2003-132435A discloses a hotel guest server system that enables provision of a service and payment to be performed using room keys and personal identification numbers in hotels. JP 2003-132435A discloses that a room key of a hotel has an RFID radio tag storing in advance information of a room number, a personal identification number, a guest number, an amount to be paid, or the like attached thereto and the payment is made at once at check-out.

In a conventional authentication method using an ID and a password, it is necessary for a user to input his or her ID and password in order to receive various services, and to make effort of inputting and to remember the information, which cannot be said to be convenient. In addition, the risk of leakage of information including the ID and password still remains.

However, when a user uses a service via a voice assistant in a public place that can be used by many unspecified people, such as a hotel, it is necessary to save various kinds of information associated with biometric information in the voice assistant to use an authentication method such as the above-described FIDO. Such various kinds of information associated with biometric information will be referred to as biometric authentication information below. Saving biometric authentication information in a voice assistant being used in a house of a user is not a problem, however, it is anticipated that registering biometric authentication information in a device disposed in a place used by many unspecified people may cause resistance in users due to the possibility of leakage of the biometric authentication information.

SUMMARY OF THE INVENTION

The present invention provides a system that can improve user convenience and provide a secure authentication method.

A system according to an embodiment of the present invention is a system including an information processing terminal having an authentication module for biometric authentication and a storage unit with tamper resistance that stores biometric information of a user necessary when an authentication process is performed using the authentication module, and a voice operation device that receives voice input and executes a process corresponding to the input. The voice operation device has a first requesting unit that makes a process request corresponding to voice input of the user to an external system in accordance with the input, a reception unit that receives an authentication request from the external system, a second requesting unit that makes a request for an authentication process to the information processing terminal of the user in accordance with the authentication request via wireless communication, and a transmission unit that transmits an authentication result from the information processing terminal to the external system. The information processing terminal has an execution unit that executes a biometric authentication process using the authentication module and the biometric information stored in the storage unit in accordance with the request for the authentication process from the voice operation device and a transmission unit that transmits the authentication result of the biometric authentication process to the voice operation device.

Further features of the present invention will become apparent from the following description of exemplary embodiments (with reference to the attached drawings).

DESCRIPTION OF THE EMBODIMENTS

Exemplary embodiments for implementing the present invention will be described with reference to the drawings and the like.

Note that the present invention relates to a mechanism in which a service provided from an external system via a network performs biometric authentication on a device (an information processing terminal) at the hand of a user in order to authenticate the user, and as a result, the service can authenticate the user. This can be realized by registering information associated with biometric authentication contained in the device at the hand of the user, for example, authentication identification information, a public key, and the like, in the service in advance.

Although FIDO is exemplified as an example of such a mechanism, it should be noted in advance that the present invention is not limited to FIDO. Note that, although a mobile terminal 103 carried by a user is described as an example of a device at the hand of the user that performs biometric authentication in the present embodiment, the invention is not limited thereto. As another example, a case in which a voice assistant 105 and a server 102 perform biometric authentication will be described in a second embodiment.

First Embodiment

Figure 1:
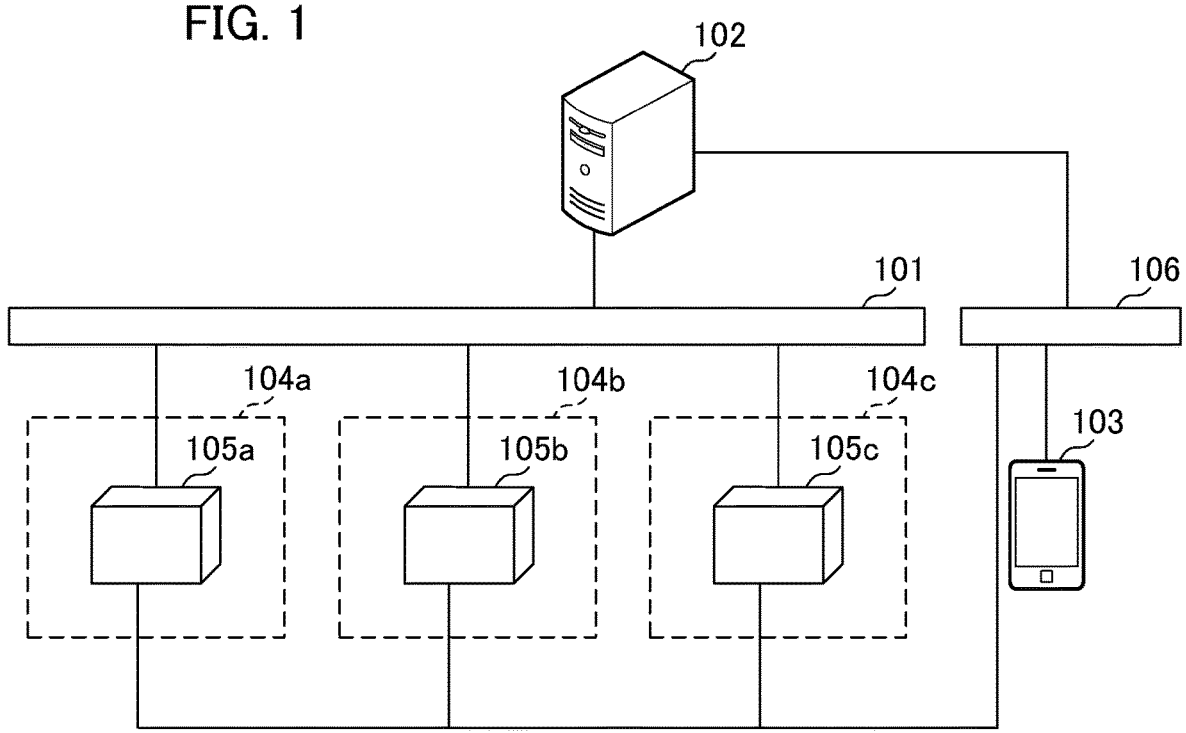
FIG. 1 is a diagram illustrating an overall configuration of a system according to an embodiment of the present invention.

FIG. 1 is a diagram illustrating an example of an overall configuration of a system according to an embodiment of the present invention.

The system illustrated in FIG. 1 includes the server 102, the mobile terminal 103, and voice assistants (voice operation devices) 105a to 105c.

Note that matters common to the voice assistants 105a to 105c will be described with respect to voice assistants 105 for the sake of convenience in description. Although FIG. 1 illustrates that the three voice assistants 105 are connected to a network 101 and the plurality of voice assistants 105 are installed, the invention is not limited thereto, and one or a plurality of voice assistants may be provided. In addition, the server 102 is an external system that provides services and may be constituted by a plurality of devices, and some or all of the devices may be constructed using resources of virtual machines, storages, and the like.

The server 102 and the voice assistants 105 are connected to each other via the network 101. The network 101 is one of, for example, a LAN including the Internet, a WAN, a telephone line, a dedicated digital line, an ATM, a frame relay line, a cable television line, a data broadcasting radio line, and the like. In addition, the network 101 is a so-called communication network realized by combining the above-described lines. The network 101 may be any on which it is possible to transmit and receive data.

The server 102 and the voice assistants 105 are connected to each other via the mobile terminal 103 and a network 106. The network 106 also includes, for example, short range wireless communication such as near field communication (NFC) or Bluetooth (registered trademark) in addition to the above-described network lines such as a LAN.

It is assumed in the present embodiment that the voice assistants are installed in an accommodation facility such as a hotel. The voice assistants 105a to 105c are each installed in rooms 104a to 104c which are rooms of the hotel. That is, the voice assistant 105a is installed in the room 104a. Note that matters common to the rooms 104a to 104c will be described with respect to the rooms 104 for the sake of convenience in description.

Figure 2:
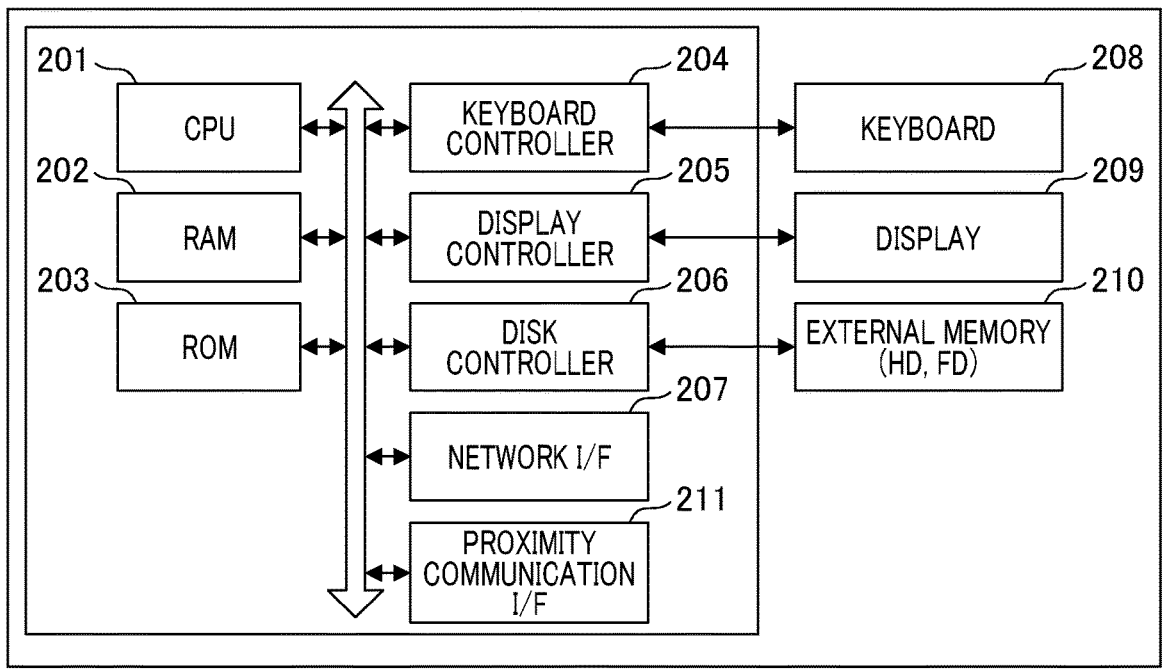
FIG. 2 is a diagram illustrating a hardware configuration example of a server.

FIG. 2 is a diagram illustrating a hardware configuration example of the server 102.

A CPU 201 executes programs stored in a ROM 203 and programs such as an operating system (OS) and applications loaded on a RAM 202 from an external memory 210. That is, by executing a program stored in a readable storage medium, the CPU 201 functions as each processing unit that executes the process of each flowchart, which will be described below.

The RAM 202 is a main memory of the CPU 201 and functions as a work area or the like. A keyboard controller 204 controls operation input from a keyboard 208 or a pointing device, which is not illustrated. The pointing device is, for example, a mouse, a touch pad, a touch panel, a track ball, or the like. A display controller 205 controls display of a display 209.

A disk controller 206 controls data access to the external memory 210 such as a hard disk (HD) or a flexible disk (FD) storing various kinds of data. A network I/F 207 is connected to a network and executes a process of controlling communication with another apparatus connected to the network. A proximity communication I/F 211 is a network I/F that supports a proximity communication method such as NFC or Bluetooth (registered trademark) and communicates with the mobile terminal 103 and the like to exchange data.

Figure 3:
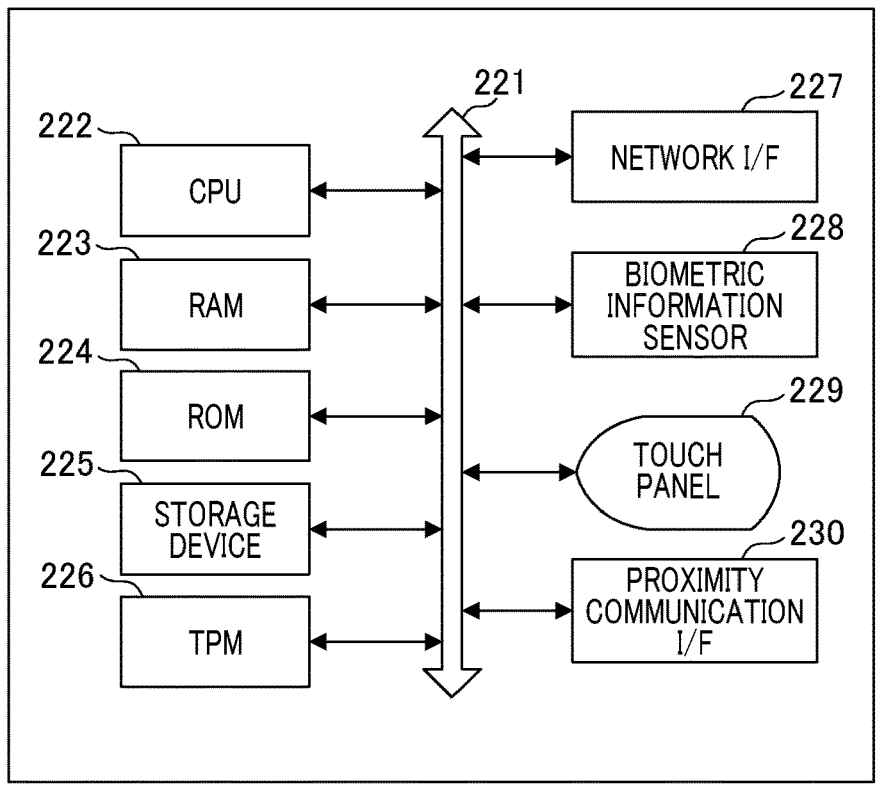
FIG. 3 is a diagram illustrating a hardware configuration example of a mobile terminal.

FIG. 3 is a diagram illustrating a hardware configuration example of the mobile terminal 103.

A CPU 222 executes programs stored in a ROM 224 and a storage device 225 and comprehensively controls each of constituent elements, which will be described below, via an internal bus 221. The programs also include a program that realizes each flowchart which will be described below. A RAM 223 functions as a memory or a work area of the CPU 222.

The storage device 225 is a storage device such as a solid state drive (SSD) or an SD memory card, and functions as an external storage device. A tamper module (TPM) 226 is a storage unit with a tamper resistance property for preventing stored data from being read from the outside, for the purpose of processing or storing confidential information. A network I/F 227 exchanges data with an external network apparatus unidirectionally or bidirectionally.

The biometric information sensor 228 is a sensor that reads biometric information of a user, and converts biometric information, for example, a fingerprint, an iris, a vein, a voiceprint, a face image, or the like of the user, into a readable signal. Note that biometric information is not limited thereto. A touch panel 229 has two functions of display and input, displays an application screen, a keyboard, and the like, and outputs information of a touched screen position as signal information to the outside when the user exerts pressure on the screen with his or her hand or a dedicated pen.

When an application uses the output signal information, the user can operate the application through the touch panel 229. A proximity communication I/F 230 is a network I/F that supports a proximity communication method such as NFC or Bluetooth (registered trademark) and communicates with the server 102 and the like to exchange data.

Figure 4:
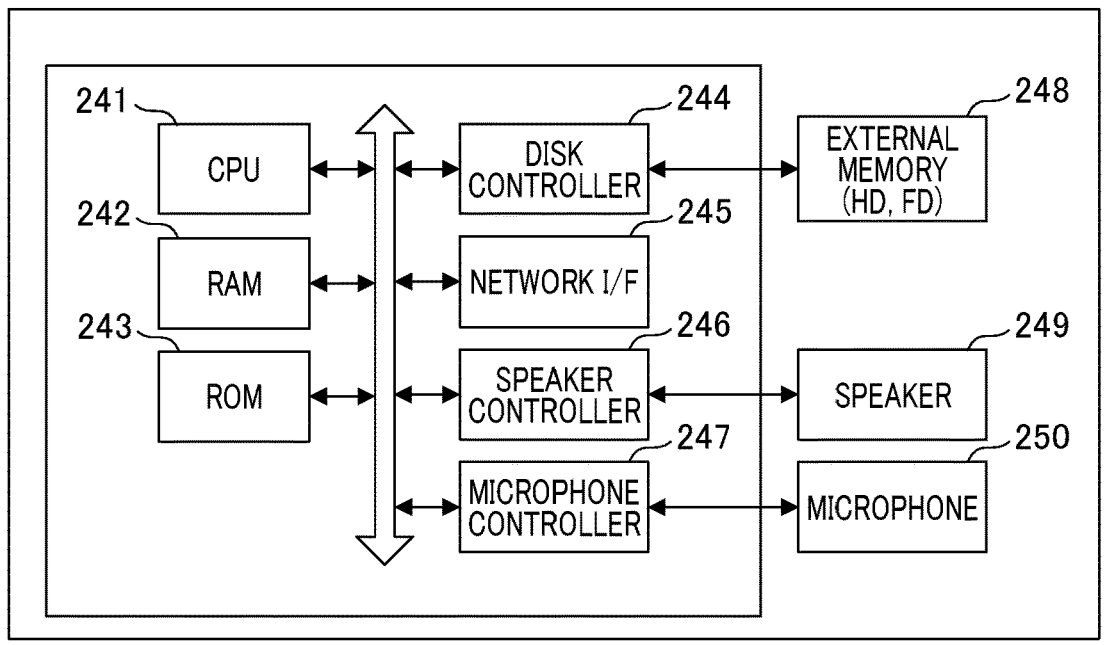
FIG. 4 is a diagram illustrating a hardware configuration example of a voice assistant.

FIG. 4 is a diagram illustrating a hardware configuration example of a voice assistant 105.

The CPU 241 executes programs stored in a ROM 243 and programs such as an operating system (OS) and applications loaded on a RAM 242 from an external memory 248. That is, by executing a program stored in a readable storage medium, the CPU 241 functions as each processing unit that executes the process of each flowchart, which will be described below.

The RAM 242 is a main memory of the CPU 241 and functions as a work area or the like. A disk controller 244 controls data access to the external memory 248 such as a hard disk (HD) or a flexible disk (FD) storing various kinds of data. A network I/F 245 is connected to a network and executes a process of controlling communication with another apparatus connected to the network. A speaker controller 246 controls a speaker 249. A microphone controller 247 controls a microphone 250.

Note that the voice assistant 105 is not limited to having the hardware configuration illustrated in FIG. 4. The voice assistant is a voice operation device that receives voice input and executes a process corresponding to the input, and can also execute, for example, a biometric authentication process in the second embodiment, which will be described below. In this case, the voice assistant 105 may also be hardware for reading biometric information, for example, a camera, or the like.

Figure 5A:
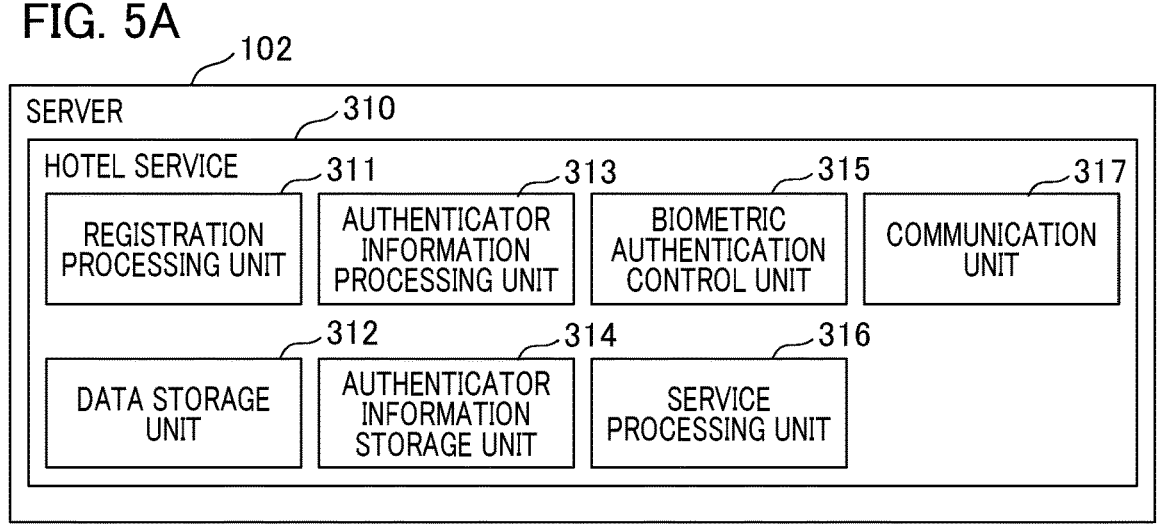
FIG. 5A to FIG. 5C are diagrams illustrating an example of a functional configuration of each device.

FIG. 5A is a diagram illustrating an example of a functional configuration of the server 102.

In the server 102, a hotel service 310 is operated as an example of a service to be provided to users. The hotel service 310 is realized when the CPU 201 of the server 102 reads a program stored in the ROM 203 thereof into the RAM 202 and executes the program.

The hotel service 310 has a registration processing unit 311, a data storage unit 312, an authenticator information processing unit 313, an authenticator information storage unit 314, a biometric authentication control unit 315, a service processing unit 316, and a communication unit 317. The registration processing unit 311 is a software module that stores data such as user information and a user's accommodation history in the data storage unit 312.

The authenticator information processing unit 313 is a software module that stores information regarding an authenticator 330, which will be described below, in the authenticator information storage unit 314 using a credential received by the communication unit 317. In addition, the authenticator information processing unit 313 verifies assertion information (assertion), which will be described below, received by the communication unit 317.

The communication unit 317 is a software module that communicates with an external apparatus such as the voice assistant 105 or the mobile terminal 103 via the network I/F 207. The authenticator information storage unit 314 is a software module that stores information regarding the authenticator 330 (authenticator information), which will be described below, in the external memory 210 or an external storage system (not illustrated) using Table G.

The biometric authentication control unit 315 is a software module that makes a biometric authentication request to the authenticator 330 and receives the result of the biometric authentication. In the present embodiment, the biometric authentication control unit 315 makes a biometric authentication request to the authenticator 330 of the mobile terminal 103 via the voice assistant 105. Note that, although the biometric authentication control unit 315 is included in the hotel service 310 in the present embodiment, the present invention is not limited thereto.

The biometric authentication control unit 315 may be, for example, configured independently of the hotel service 310 and the hotel service 310 may call out the independent biometric authentication control unit 315. By configuring the biometric authentication control unit 315 to be independent from the hotel service 310 as described above, the biometric authentication control unit 315 can be configured to be called out not only by the hotel service 310 but also by another service.

The service processing unit 316 is a software module that searches for service information or makes a service reservation in accordance with a service request received by the communication unit 317. The service processing unit 316 stores information regarding provision of a service (service provision information), which will be described below, in the data storage unit 312 using Table D.

Figure 5B:
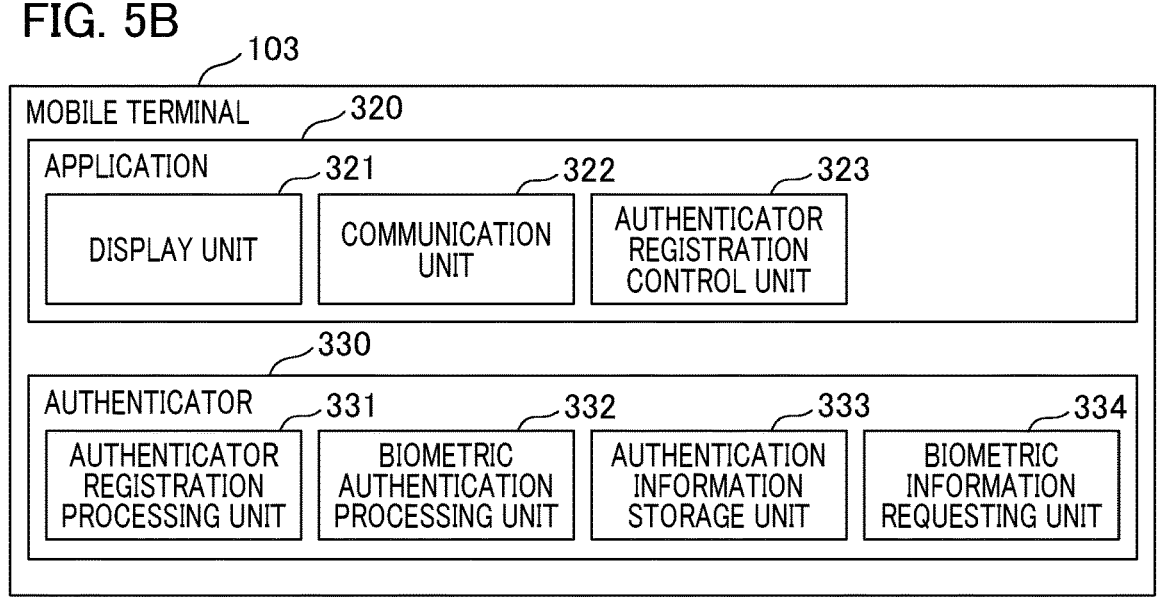

FIG. 5B is a diagram illustrating an example of a functional configuration of the mobile terminal 103.

In the mobile terminal 103, an application 320 and the authenticator 330 are operated. The application 320 and the authenticator 330 are realized when the CPU 222 of the mobile terminal 103 reads a program stored in the ROM 224 thereof into the RAM 223 and executes the program.

The application 320 provides the authentication function using biometric information according to the present embodiment and a service of the server 102 to the user in cooperation with the server 102. The application 320 is a native application or a web browser installed in the mobile terminal 103. The application 320 has a display unit 321, a communication unit 322, and an authenticator registration control unit 323.

The display unit 321 is a software module that provides a UI of an application installed in the mobile terminal 103 or receives operations of the user via the touch panel 229. The communication unit 322 is a software module that communicates with an external apparatus such as the server 102 via the network I/F 227 or the proximity communication I/F 230. The authenticator registration control unit 323 is a software module that makes a request for creation of a credential, which will be described below, to the authenticator 330.

Note that, although the authenticator registration control unit 323 is included in the application 320 in the present embodiment, the present invention is not limited thereto. For example, the authenticator registration control unit 323 may be configured independently of the application 320, and the application 320 may call out the independent authenticator registration control unit 323. In addition, the authenticator registration control unit 313 may be mounted in the OS by default.

By configuring the authenticator registration control unit 323 to be independent of the application 320 as described above, another application as well as the application 320 can call out the authenticator registration control unit 323.

The authenticator 330 is an authentication module for biometric authentication using biometric information read from the biometric information sensor 228. The authenticator 330 has an authenticator registration processing unit 331, a biometric authentication processing unit 332, an authentication information storage unit 333, and a biometric information requesting unit 334.

The authenticator registration processing unit 331 receives a request for creating a credential from the authenticator registration control unit 323 of the application 320, or the like. In addition, the authenticator registration processing unit 331 is a software module that creates paired keys (a secret key and a public key) and a credential. The biometric authentication processing unit 332 is a software model that receives a biometric authentication request from the biometric authentication control unit 315 of the hotel service 310, or the like, and performs biometric authentication using biometric information read by the biometric information sensor 228.

The authentication information storage unit 333 is a software model that stores authentication information and the like for the TPM 226. The authentication information is, for example, the information shown in Table A, which will be described below. The biometric information requesting unit 334 is a software module that provides a UI for receiving input of biometric information to the user via the touch panel 229.

Figure 5C:
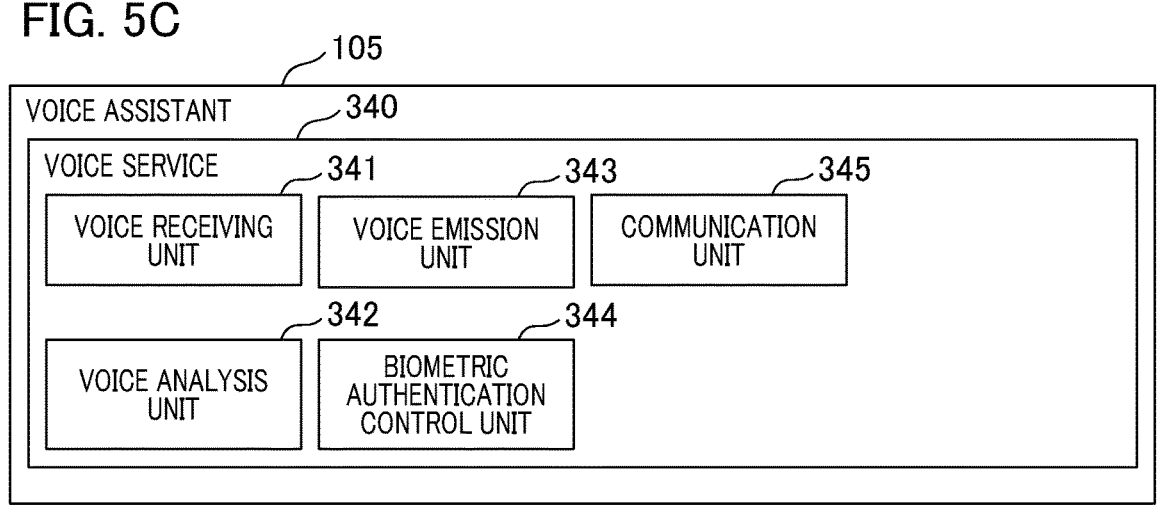

FIG. 5C is a diagram illustrating an example of a functional configuration of the voice assistant 105.

In the voice assistant 105, a voice service 340 is operated. The voice service 340 is realized when the CPU 241 of the voice assistant 105 reads a program stored in the ROM 243 thereof into the RAM 242 and executes the program. The voice service 340 provides the service of the server 102 to the user in cooperation with the server 102.

The voice service 340 has a voice receiving unit 341, a voice analysis unit 342, a voice emission unit 343, a biometric authentication control unit 344, and a communication unit 345. The voice receiving unit 341 is a software module that receives a voice emitted by the user via the microphone 250 of the voice assistant 105. The voice analysis unit 342 is a software module that analyzes the voice received by the voice receiving unit 341.

The voice emission unit 343 is a software module that provides guidance to the user by voice via the speaker 249 of the voice assistant 105. The biometric authentication control unit 344 is a software module that makes a biometric authentication request to the authenticator 330 and receives the result of the biometric authentication. The communication unit 345 is a software module that communicates with an external apparatus such as the server 102 or the mobile terminal 103 via the network I/F 245.

Next, various kinds of data stored by the mobile terminal 103 and the server 102 will be described.

Table A is an example of data stored by the authentication information storage unit 333 of the authenticator 330 of the mobile terminal 103 in the TPM 226.

TABLE A

| Authentication information ID | Service ID | Secret key | Biometric information ID |
|---|---|---|---|
| 407c-8841-79d | hotel-service.com | 1faea2da-a269-4fa7-812a-509470d9a0cb | d493a744 |
| 4c04-428b-a7a2 | service-a.com | d7ae30c8-3775-4706-8597-aaf681bc30f5 | dcc97daa |
| 92b2-498d-bea6 | service-b.com | 36ae5eed-732b-4b05-aa7b-4dddb4be3267 | 51caacaa |
| ... | ... | ... | ... |

In the authentication information management table shown in Table A, one record represents one entry of authentication information. The records of Table A are created when the mobile terminal 103 registers the authenticator 330 in the hotel service 310 of the server 102 and then added to Table A. In the authentication information ID column, IDs for uniquely identifying each piece of authentication information are stored. In the service ID column, IDs for uniquely identifying services that use the authentication function performed using the biometric information are stored.

In the present embodiment, domain names of services, specifically, information of a top-level domain and second-level domains, are used as the service IDs. For example, when the URL of the hotel service 310 is http://www.hotel-service.com, the service ID of the hotel service 310 is assumed to be hotel-service.com. In the secret key column, secret keys among created paired keys are stored. The public keys corresponding to (paired with) the secret keys are registered in the services shown in the service ID column.

In the biometric information ID column, IDs corresponding to feature amounts of biometric information are stored. A procedure of storing information corresponding to each column of the authentication information management table and a procedure of storing a public key in the service will be described later. Note that the authentication information management table shown as Table A is an example, Table A is not limited thereto, and other information may be stored. For example, IDs used in a service to uniquely identify users, which are used in conventional authentication for verifying the correspondence of user IDs and passwords in the service, may be stored therein.

Table B to Table G are examples of data stored in the external memory 210 or the like by the data storage unit 312 and the authenticator information storage unit 314 of the hotel service 310 of the server 102.

TABLE B

| User ID | Password | Name | Address | Age | Occupation |
|---|---|---|---|---|---|
| user001 | *** | aaa aaa | abc | 20 | Student |
| user002 | *** | bbb bbb | def | 30 | Employee |
| ... | ... | ... | ... | ... | ... |

The user information management table shown in Table B is data managed by the data storage unit 312 of the hotel service 310. In the user information management table, one record represents one piece of user information. In the user ID column, IDs for uniquely identifying users of the hotel service 310 are stored. In the password column, passwords for authenticating the users are stored. A password is designated when a user performs user registration in the hotel service 310. In addition, the user information management table may store attribute information regarding a user that is required when the user checks in to the hotel, such as the name, address, age, occupation, and the like of the user.

TABLE C

| User ID | Check-in date | Check-out date | Room number | Voice assistant ID |
|---|---|---|---|---|
| user001 | 2017 Jul. 12 | 2017 Jul. 13 | Room104a | 105a |
| user001 | 2017 Feb. 10 | 2017 Jul. 11 | Room104b | 105b |
| user002 | 2017 Jul. 12 | 2017 Jul. 13 | Room104c | 105c |
| ... | ... | ... | ... | ... |

The accommodation history management table shown in Table C is data managed by the data storage unit 312 of the hotel service 310. In the accommodation history management table, one record represents information of one stay of a user. In the user ID column, values of the user ID column of the user information managed in the user information management table (Table B) are stored. In addition, the accommodation history management table stores the check-in date, the check-out date, the room number of the room where the user stayed, and the ID for specifying the voice assistant installed in the room where the user stayed as information of one stay.

TABLE D

| User ID | Service ID | Service details | Amount | Date | Payment information |
|---|---|---|---|---|---|
| user001 | s0001 | Room service A | 1,000 yen | 2017 Feb. 10 | Yes |
| user001 | s0001 | Room service A | 1,000 yen | 2017 Jul. 12 | No |
| user002 | s0002 | Room service B | 2,000 yen | 2017 Jul. 13 | No |
| ... | ... | ... | ... | ... | ... |

The service information management table shown in Table D is data managed by the data storage unit 312 of the hotel service 310. In the service information management table, one record represents a state of one provision of service to one user. In the user ID column, the same values as in the user ID columns of the above-described Tables B and C are stored. In addition, the service information management table stores the following items as information for specifying services provided to users. That is, information such as service IDs and service details indicating details of provided services, dates on which the services were provided, and the amount, payment information, and the like in a case of a service that requires payment are stored.

TABLE E

| Voice assistant ID | Mobile terminal (Authenticator) |
|---|---|
| 105a | a12345 |
| 105b | a23456 |
| 105c | a34567 |
| ... | ... |

The association information management table shown in Table E is data managed by the data storage unit 312 of the hotel service 310. In the association information management table, the voice assistants 105 installed in the rooms where users stayed are associated with the authenticators 330 that are the mobile terminals 103 used by the users and registered in the hotel service 310.

As an example, a case in which one voice assistant 105 is installed in one room will be described. The voice assistant 105a is installed in the room 104a. When a user staying in the room 104a registers the authenticator 330 in an authenticator registration process, which will be described below, the ID of the voice assistant 105a and the ID of the registered authenticator are associated and stored.

Note that there are also cases in which two or more users use the voice assistant 105 in one room. In this case, registration of authenticators is performed with respect to each of authenticators 330 that are the mobile terminals 103 owned by the users. Then, in the association information management table, two or more authenticators 330 are associated with and registered in one voice assistant 105.

TABLE F

| attestation challenge | User ID | Expiration date |
|---|---|---|
| 65C9B063-9C33 | user001 | 2017-07-13T12:00:34Z |
| 7317EFBA-4E63 | user101 | 2017-07-13T12:03:12Z |
| ... | ... | ... |

The attestation challenge management table shown in Table B is data managed by the data storage unit 312 of the hotel service 310. In the attestation challenge management table, one record represents one piece of information of an attestation challenge. The attestation challenge is a parameter used as verification data for performing challenge response authentication and is issued for each user.

An attestation challenge issuance process will be described below. In the attestation challenge column, values of the attestation challenge are stored. In the user ID column, user IDs of users for whom the attestation challenge is issued are stored. In the expiration date column, the expiration dates of the attestation challenges are stored.

TABLE G

| Authentication information ID | Public key | User ID |
|---|---|---|
| 407c-8841-79d | AC43C5FB-BFA2-48D1-A71B-FB04ACDA347A | user001 |
| 4c04-428b-a7a2 | 8143CA9F-35C9-4333-*948F-BFCE66A74310 | user002 |
| ... | ... | ... |

The authenticator information management table shown in Table G is data managed by the authenticator information storage unit 314 of the hotel service 310. In the authenticator information management table, one record represents one piece of authenticator information. When the authenticator 330 is registered in the server 102, a record is added to the authenticator information management table.

In the authentication information ID column, the values of the authentication information ID column of the authentication information managed by the registered authenticator 330 in the authentication information management table (Table A) are stored. In the public key column, public keys corresponding to (paired with) secret keys created by the authenticator 330 and managed in the authentication information management table (Table A) are stored.

That is, with respect to secret keys and public keys associated with the same values of the authentication information IDs in the authentication information management table (Table A) and the authenticator information management table (Table G), data encrypted with the secret keys stored in Table A can be decrypted with the public keys stored in Table G In the user ID columns, IDs used by the hotel service 310 to uniquely identify users are stored.

Figure 6:
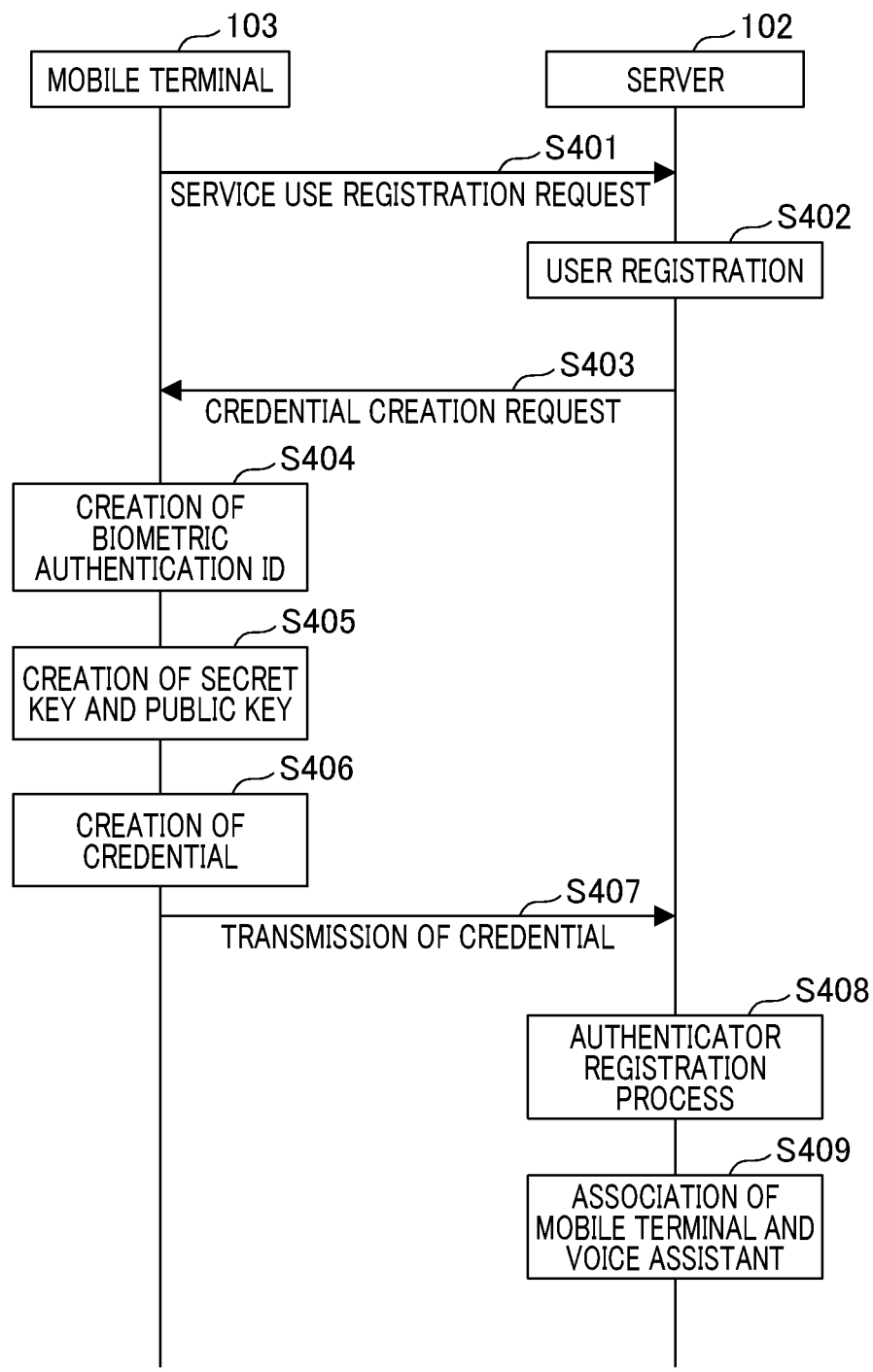
FIG. 6 is a sequence diagram illustrating a process to start use of a service.

Next, a process of starting use of the hotel service 310 when a new guest (user) of a hotel checks in to the hotel will be described with reference to FIG. 6.

In the process of starting use of the hotel service 310, a process of registering the authenticator 330 of the mobile terminal 103 carried by the user in the server 102 is executed.

Although a case in which the authenticator 330 of the mobile terminal 103 is registered will be described below, the same description applies to a case in which an authenticator is included in the voice assistant 105. Note that registering information of the authenticator 330 in the server 102 is simply referred to as registration of an authenticator.

Note that, in order to use the hotel service 310, a user is assumed to install the application 320 associated with the hotel service 310 in the mobile terminal 103 in advance. Alternatively, the URL of a web service provided by the hotel service 310 may be designated and then a service screen for using the hotel service 310 may be displayed in the web browser of the mobile terminal 103.

A case in which a user uses the application 320 of the mobile terminal 103 to execute the process of starting use of the hotel service 310 will be described. First, the application 320 displays a check-in screen through a user operation. Specifically, the check-in screen is displayed by operating a menu display (not illustrated) of the application 320.

Figure 9:
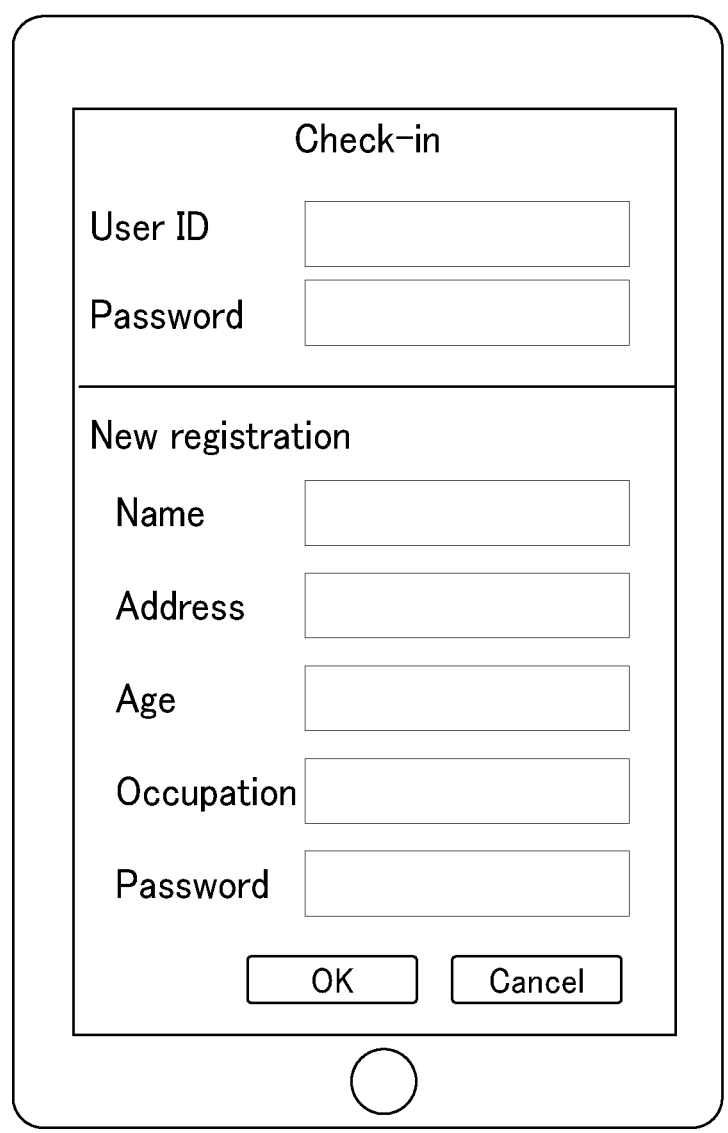
FIG. 9 is a diagram illustrating an example of a check-in screen.

FIG. 9 is an example of the check-in screen displayed by the display unit 321 of the application 320.

The user inputs attribute information of the user necessary for checking in to a hotel, such as his or her name, address, age, occupation, and the like and a password to be used in the hotel service 310.

The description will now return to FIG. 6. In Step S401, upon receiving the input of the user information, the application 320 transmits a use registration request of the user to the hotel service 310 via the communication unit 322. Note that the request includes the attribute information and the password input by the user. The communication unit 317 of the hotel service 310 receives the request transmitted from the application 320 in Step S401.

In Step S402, the registration processing unit 311 of the hotel service 310 issues a user ID and stores user information including the user ID in the user information management table (Table B) of the data storage unit 312. The user information includes the attribute information and the password received in Step S401. In Step S403, the authenticator information processing unit 313 of the hotel service 310 transmits a credential creation request to the application 320 via the communication unit 317.

A parameter included in the credential creation request will be described below.

The parameter included in the credential creation request is constituted by account information, an encrypted parameter, an attestation challenge, and an authentication extended area. The account information stores the user ID registered in Step S402 for the hotel service 310 and the attribute information associated with the user ID.

The encrypted parameter stores the attribute information regarding registered authentication information such as an encryption algorithm supported by the hotel service 310 or the like. The attestation challenge stores verification data to be used for performing challenge response authentication. The verification data, that is, the attestation challenge, is created when the parameter included in the credential creation request is created in Step S402.

Then, the created attestation challenge is stored in the attestation challenge management table (Table F) in association with the user ID, the expiration date, and the like. The authentication extended area stores an extended parameter that can be designated by the hotel service 310. For example, the authentication extended area stores a parameter for controlling an operation of the authenticator 330, and the like.

The description will now return to FIG. 6. The communication unit 322 of the application 320 receives the credential creation request transmitted in Step S403. Upon receiving the credential creation request, the display unit 321 of the application 320 displays a biometric information registration screen for making a request for input of biometric information used in biometric authentication to the user.

Figure 10:
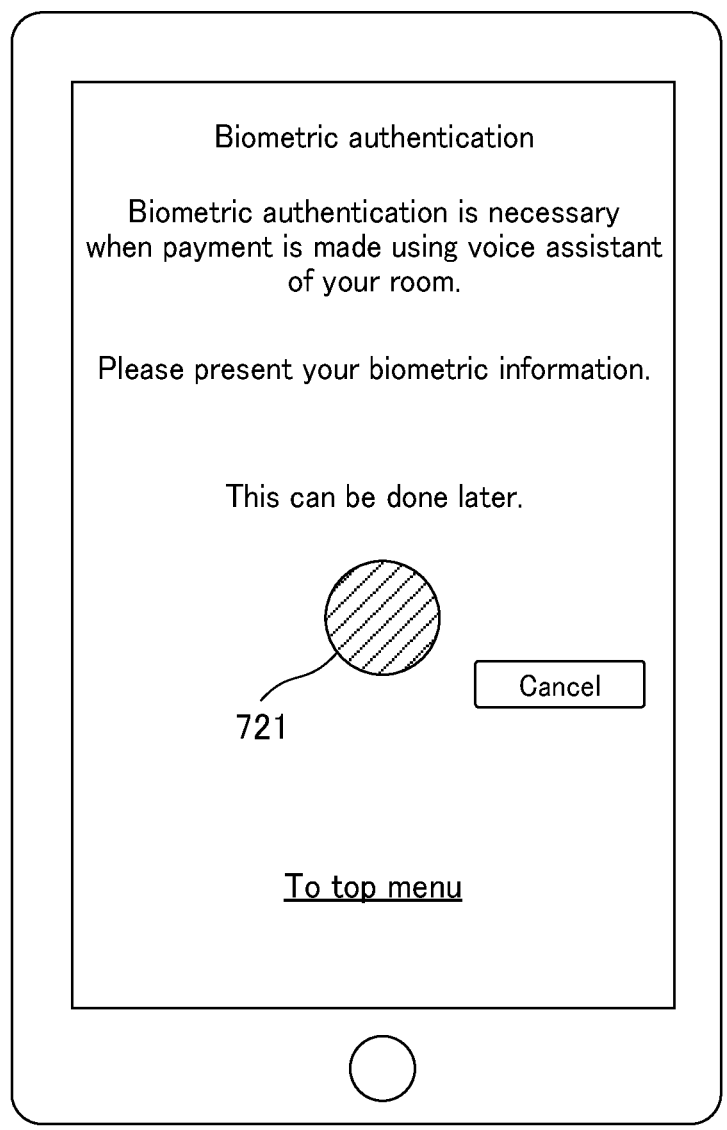
FIG. 10 is a diagram illustrating an example of a biometric information registration screen.

FIG. 10 is an example of the biometric information registration screen.

The biometric information registration screen urges the user to input biometric information to register the authenticator 330 in the hotel service 310. A button 721 is for reading biometric information such as a fingerprint and includes the biometric information sensor 228. Note that information of a vein, an iris, a voiceprint, a face image, or the like can be used as biometric information, and is not limited thereto.

Here, the mobile terminal 103 is configured such that any piece of the biometric information or a combination of a plurality of arbitrary pieces of the biometric information is input as the biometric information to be used in biometric authentication. In addition, although the input of biometric information is requested as described above at the time of check-in in the present embodiment, the present invention is not limited thereto. For example, the input of biometric information may be requested later when biometric authentication is actually necessary, without requesting the input of biometric information at the time of check-in.

When the biometric information sensor 228 reads the biometric information on the biometric information registration screen, the authenticator registration control unit 323 of the application 320 transfers the biometric information to the authenticator 330 and requests creation of a credential. The request of this time includes the parameter included in the credential creation request received from the hotel service 310 in Step S403 and a service ID, in addition to the read biometric information.

The service ID is an ID for uniquely identifying a service described in the authentication information management table (Table A) for which the authenticator 330 is registered. In this case, the service ID of the hotel service 310 is included. In addition, an application ID that is an ID for uniquely specifying the application 320 which is used to register the authenticator 330 in the hotel service 310, or the like may be included.

The description will now return to FIG. 6. In Step S404, the biometric authentication processing unit 332 of the authenticator 330 creates a biometric information ID for uniquely identifying a feature amount of the biometric information received from the application 320 and the biometric information itself. The feature amount of the biometric information is a value obtained by converting information unique to an individual such as the pattern of a fingerprint, the pattern of an iris, the shape of a vein, or a voiceprint into a value not impairing the uniqueness. In the biometric authentication, the individual is specified using the feature amount unique to the individual.

In Step S405, the authenticator registration processing unit 331 creates a pair of a secret key and a public key and an authentication information ID for uniquely identifying authentication information. Then, the authenticator registration processing unit 331 stores the following information in the authentication information management table (Table A) stored in the TPM 226 via the authentication information storage unit 333. That is, the biometric information ID created in Step S404, the secret key and the authentication information ID created in Step S405, and the service ID for which the authenticator is registered are stored.

In the present embodiment, the service ID of the hotel service 310 included in the credential creation request received by the authenticator 330 from the application 320 is stored. In Step S406, the authenticator registration processing unit 331 creates a credential.

The credential will be described below.

The credential is constituted by an authentication information ID, an algorithm, a public key, and an attestation. The authentication information ID is the authentication information ID created in Step S405 and stored in the authentication information management table (Table A). In addition, the public key is the public key of the key pair created in Step S405.

The algorithm stores an algorithm used to create the key pair in Step S405. In addition, the attestation is data obtained by encrypting the attestation challenge of the parameter included in the credential creation request received in Step S403 using the secret key generated in Step S405. The authenticator registration processing unit 331 transfers the credential created in Step S406 and an authenticator ID for specifying the authenticator 330 of the application 320 to the application 320.

In Step S407, the communication unit 322 of the application 320 transmits the credential and the authenticator ID received from the authenticator 330 to the hotel service 310. In Step S408, the authenticator information processing unit 313 of the hotel service 310 performs a registration process of the authenticator 330 using the received credential.

A credential registration process executed by the authenticator information processing unit 313 will be described below.

First, the authenticator information processing unit 313 decrypts the attestation included in the credential using the public key included in the same credential to verify whether the registration request is not illegitimate.

Furthermore, the authenticator information processing unit 313 specifies a record of an attestation challenge column of the attestation challenge management table (Table F) having the same value as the value obtained by encrypting the attestation with the public key. Then, the authenticator information processing unit 313 sets the user ID of the specified record as the user ID associated with the credential.

Then, the authenticator information processing unit 313 stores (registers) the authentication information ID and the public key included in the credential and the user ID associated with the credential in the authenticator information management table (Table G).

The description will now return to FIG. 6. In Step S409, the registration processing unit 311 stores an association of the voice assistant 105 installed in the room where the user is staying with the authenticator ID received in Step S407 in the association information management table (Table E). Finally, the communication unit 317 of the hotel service 310 reports that the authenticator registration process has been completed normally to the application 320 of the mobile terminal 103.

Next, a process performed by a user to use the hotel service 310 via the voice assistant 105 will be described using FIG. 7.

The user makes a request for use of the hotel service 310 by speech (voice) to the voice assistant 105. For example, when the user wants room service, the request can be made by speaking "tell me a list of room service."

Note that room service is an example of service provided by the hotel service 310, and it is not limited thereto. By using the hotel service 310, reservation of a ticket or taxi, and the like are also possible. In addition, by using the hotel service 310, the user can also contact the hotel about the fact that the room where the user is staying does not need cleaning, or the like.

In Step S501, the voice receiving unit 341 of the voice service 340 of the voice assistant 105 receives a request for provision of the service through voice of the user. In Step S502, the voice analysis unit 342 analyzes the received voice and determines details of the request. In Step S503, the communication unit 345 transmits a process request analyzed in Step S502 to the hotel service 310.

The communication unit 317 of the hotel service 310 receives a request from the voice assistant 105. In Step S504, the service processing unit 316 of the hotel service 310 executes a process corresponding to the received request. Specifically, first, the service processing unit 316 determines whether user authentication is necessary to execute the received request. Whether user authentication is necessary is set in advance when information regarding the service is registered in the hotel service 310.

For example, a request accompanied by payment may be set to need user authentication. When user authentication is determined not to be necessary to execute the request, the service processing unit 316 executes a process corresponding to the request, without requiring user authentication. Here, a case in which the request is "tell me a list of room service" will be described. That is, a list of available room service may be transmitted to the voice assistant 105 serving as a requesting source.

Since the request is not a request accompanied by payment, the service processing unit 316 determines that user authentication is unnecessary. Then, the service processing unit 316 searches for room service as a process corresponding to the request "tell me a list of room service." Note that a process performed when user authentication is necessary will be described below in Step S510.

In Step S505, the service processing unit 316 replies with the list of room service to the voice assistant 105 via the communication unit 317. Note that, at this time, the service processing unit 316 may search the service information management table (Table D) for a history of order of the past room service by the user associated with the voice assistant 105 serving as a requesting source and reply with the list along with suggestion information of recommended room service.

The communication unit 345 of the voice service 340 receives the list of room service from the hotel service 310. In Step S506, the voice emission unit 343 of the voice service 340 gives voice guidance to the user about the received list of room service. The user orders a specific menu of the room service by speech (voice) to the voice assistant 105. That is, a request is made to the hotel service 310.

Since the processes of Steps S507 to S509 in which the voice assistant 105 receives the request and transmits the user's request to the hotel service 310 are the same as the processes of Steps S501 to S503, description thereof is omitted. In Step S510, the service processing unit 316 of the hotel service 310 executes a process in accordance with the received request. Specifically, the service processing unit 316 determines whether user authentication is necessary to execute the received request, as in Step S504.

Here, since what requested is the order of the specific menu of the room service and it is a request accompanied by payment, the service processing unit 316 determines that user authentication is necessary. Thus, in Step S511, the authenticator information processing unit 313 of the hotel service 310 makes a request for user authentication, i.e., a biometric authentication request, to the voice assistant 105 via the communication unit 317. At this time, the authenticator information processing unit 313 creates a biometric authentication parameter and includes the generated biometric authentication parameter in the request.

The biometric authentication parameter will be described below.

The biometric authentication parameter is data used when the hotel service 310 performs authentication of the application 320. The biometric authentication parameter is constituted by an assertion challenge and an assertion extended area. The assertion challenge stores verification data used to perform challenge response authentication.

In the assertion extended area, an extended parameter that can be designated by the hotel service 310 to be used by the hotel service 310 for controlling an operation of the authenticator 330 or the like is stored. The assertion extended area stores, for example, a parameter for controlling an operation of the authenticator 330 or the like.

The description will now return to FIG. 7. In Step S511, when the authenticator information processing unit 313 of the hotel service 310 makes a biometric authentication request to the voice assistant 105 via the communication unit 317, the request further includes the following information. That is, the authenticator information processing unit 313 includes the authenticator ID of the association information management table (Table E) for specifying the authenticator 330 associated with the voice assistant 105 serving as a requesting source in the request.

In addition, the authenticator information processing unit 313 includes information such as the amount of the order or the like in the request. Note that, at this time, the authenticator information processing unit 313 may include suggestion information to be recommended to the user in the request. For example, the authenticator information processing unit 313 specifies user information of the room (the room 104) corresponding to the voice assistant 105 serving as a requesting source from the accommodation history management table (Table C) via the service processing unit 316.

Then, the authenticator information processing unit 313 acquires a service history of the past of the user from the service information management table (Table D) based on the user information and includes suggestion information to be recommended to the user in the request. In addition, the authenticator information processing unit 313 may include promotion information of a service, which is independent of the user, or the like in the request.

In Step S512, the biometric authentication control unit 344 of the voice service 340 specifies the authenticator 330 serving as a reporting destination of the biometric authentication request received in Step S511 from the authenticator ID included in the request. In Step S513, the biometric authentication control unit 344 makes a biometric authentication request to the mobile terminal 103. Note that the biometric authentication request includes an auth-biometric authentication parameter.

The auth-biometric authentication parameter included in the biometric authentication request transmitted from the voice assistant 105 to the mobile terminal 103 will be described.

The auth-biometric authentication parameter includes the biometric authentication parameter created by the authenticator information processing unit 313 of the hotel service 310 and transmitted from the hotel service 310 to the voice assistant 105 in the above-described Step S511. Furthermore, the auth-biometric authentication parameter includes a service ID and a web origin.

The service ID stores information of the top-level domain and the second-level domain of the hotel service 310. For example, when the URL of the hotel service 310 is http://www.hotel-service.com, the service ID is hotel-service.com. The web origin is a combination of a protocol, a host name, and a port, and the origin of the hotel service 310 is stored in the present embodiment.

The description will now return to FIG. 7. When the mobile terminal 103 receives the biometric authentication request in Step S514, a biometric authentication process is executed. The biometric authentication process executed by the mobile terminal 103 will be described below.

When the mobile terminal 103 receives the biometric authentication request, the display unit 321 of the application 320 displays a biometric information input request screen.

Figure 11:
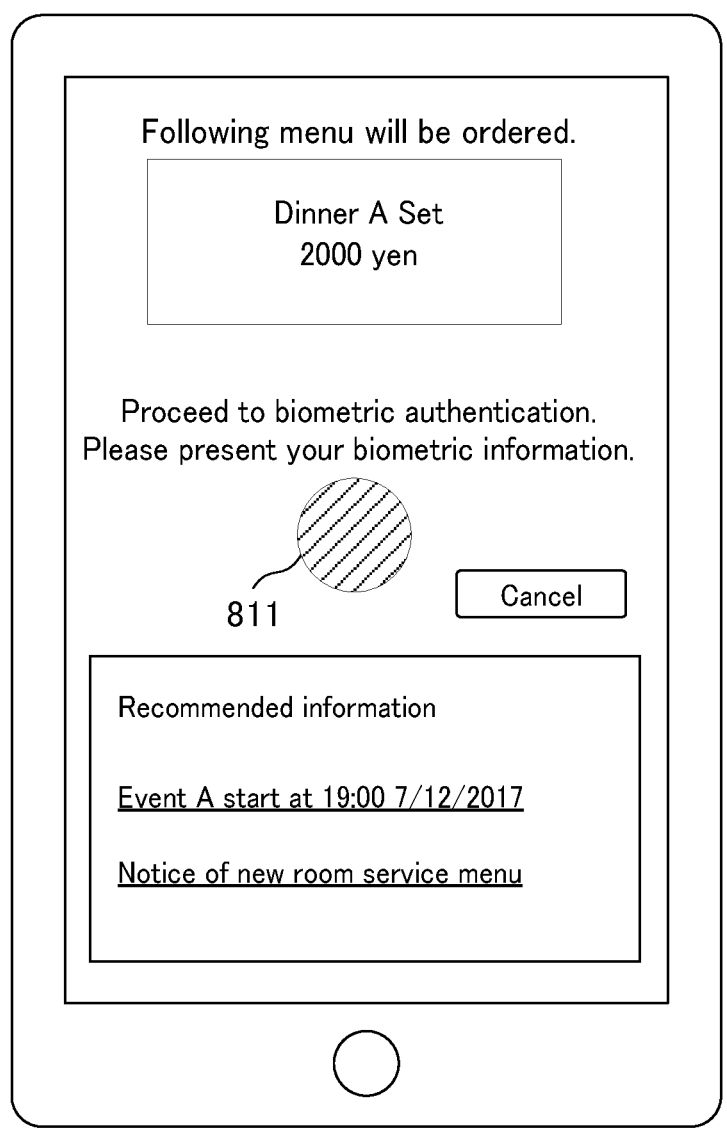
FIG. 11 is a diagram illustrating an example of a biometric information input request screen.

FIG. 11 is an example of the biometric information input request screen displayed by the display unit 321 of the application 320.

The biometric information input request screen urges the user to input the biometric information in order to execute biometric authentication in the mobile terminal 103. Note that, although the display unit 321 of the application 320 displays the biometric information input request screen in the present embodiment, the authenticator 330 may have a display unit (not illustrated) and display the screen.

A button 811 is a button for reading biometric information and includes the biometric information sensor 228. Note that various kinds of information included in the biometric authentication request transmitted from the hotel service 310 to the voice assistant 105 in Step S511 are also displayed on the biometric information input request screen. The information includes, for example, information of the price of the menu that the user ordered or the like, the suggestion information to be recommended to the user, promotion information of other service, and the like.

When the biometric information sensor 228 reads the biometric information on the biometric information input request screen, the authenticator registration control unit 323 of the application 320 transfers the biometric information to the authenticator 330 and makes an authentication request. Note that the authenticator registration control unit 323 includes the auth-biometric authentication parameter received from the voice assistant 105 in Step S513 in the authentication request.

The biometric authentication processing unit 332 of the authenticator 330 acquires a feature amount of the received biometric information. The biometric authentication processing unit 332 specifies a record from the authentication information management table (Table A) managed by the authentication information storage unit 333 on the basis of the acquired feature amount. Specifically, an authentication information ID and a secret key included in the authentication information management table (Table A) corresponding to the biometric information are specified since a biometric information ID indicated by the feature amount is specified.

That is, when the authenticator 330 succeeds in authentication after executing the biometric authentication, the secret key is taken out. Note that whether the service ID included in the auth-biometric authentication parameter matches that of Table A may be verified as well as the feature amount. Then, the biometric authentication processing unit 332 creates a signature obtained by encrypting an assertion challenge included in the auth-biometric authentication parameter with the specified secret key. Furthermore, the biometric authentication processing unit 332 creates assertion information including the specified authentication information ID and the created signature.

In Step S515, the biometric authentication processing unit 332 replies with the created assertion information to the voice assistant 105. In Step S516, the communication unit 345 of the voice service 340 replies with the assertion information received in Step S515 to the hotel service 310.

Note that, when the result of the biometric authentication process of Step S514 is authentication failure or input of the biometric information by the user is not performed for a certain period of time, the display unit 321 of the application 320 presents display indicating that authentication has failed and the process ends on the biometric information input request screen. Then, information indicating that the result of the biometric authentication process is authentication failure is replied in each of Steps S515 and S516. Upon receiving the information indicating that authentication has failed, the hotel service 310 ends the process of FIG. 7.

In Step S517, the authenticator information processing unit 313 of the hotel service 310 verifies the assertion information received in Step S516. Specifically, the authenticator information processing unit 313 verifies whether the assertion information matches an assertion challenge included in an biometric authentication parameter created in S511. Note that authenticator information management table (Table G) is used for specifying a public key.

The signature included in the assertion information is decrypted using the public key specified with the authentication ID included in the assertion information. The authenticator information management table (Table G) is used for specifying the public key. Then, it is verified whether the decrypted value matches the assertion challenge included in the biometric authentication parameter created in Step S511.

When the decrypted value does not match the assertion challenge included in the biometric authentication parameter created in Step S511, the service processing unit 316 of the hotel service 310 replies with information indicating that user authentication has failed to the voice assistant 105. Then, the service processing unit 316 ends the process. Upon receiving the information indicating that user authentication has failed, the voice emission unit 343 of the voice service 340 reports that the request received in Step S507 has not been executed to the user by voice.

On the other hand, when the decrypted value matches the assertion challenge included in the biometric authentication parameter created in Step S511, the process proceeds to Step S518. In Step S518, the service processing unit 316 of the hotel service 310 confirms the provision of the service, i.e., the order of the menu of the room service, in accordance with the request received in Step S507.

The service processing unit 316 stores information regarding the confirmed service in the service information management table (Table D). Note that, since payment is made all at once at the time of check-out, data indicating that payment has not been made is stored in the payment information of the service information management table.

Then, the service processing unit 316 makes a request for provision of the service to the person in charge of the service.

In Step S519, the service processing unit 316 transmits a reception result of the request for the provision of the service received from the voice assistant 105 in Step S509 to the voice assistant 105. In Step S520, the voice emission unit 343 of the voice service 340 reports the reception result received in Step S519 to the user by voice.

Figure 8:
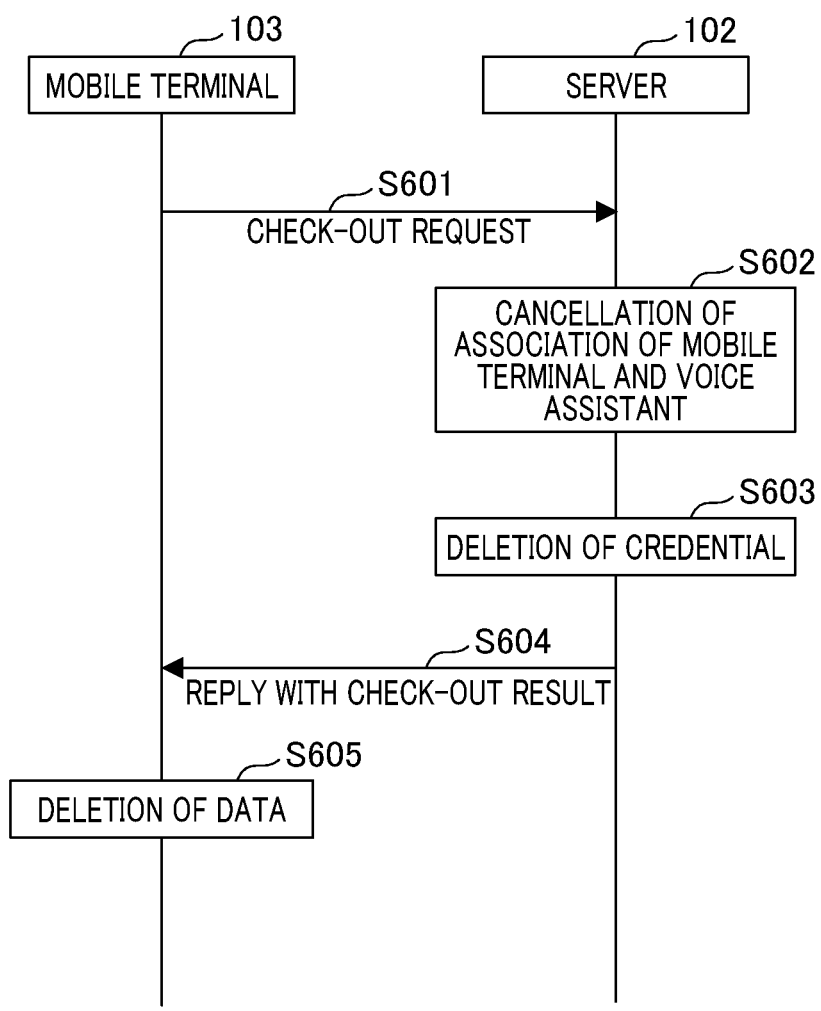
FIG. 8 is a sequence diagram illustrating a process to end use of the service.

Next, a process of ending the use of the hotel service 310 when the guest (user) of the hotel checks out will be described using FIG. 8.

In the process of ending the use of the hotel service 310, a registration cancellation process in which registration of the authenticator 330 of the mobile terminal 103 carried by the user is cancelled from the hotel service 310 is executed.

First, the user causes the application 320 of the mobile terminal 103 to be displayed on a check-out screen through a user operation. Specifically, the check-out screen is displayed by operating a menu display (not illustrated) of the application 320.

Figure 12:
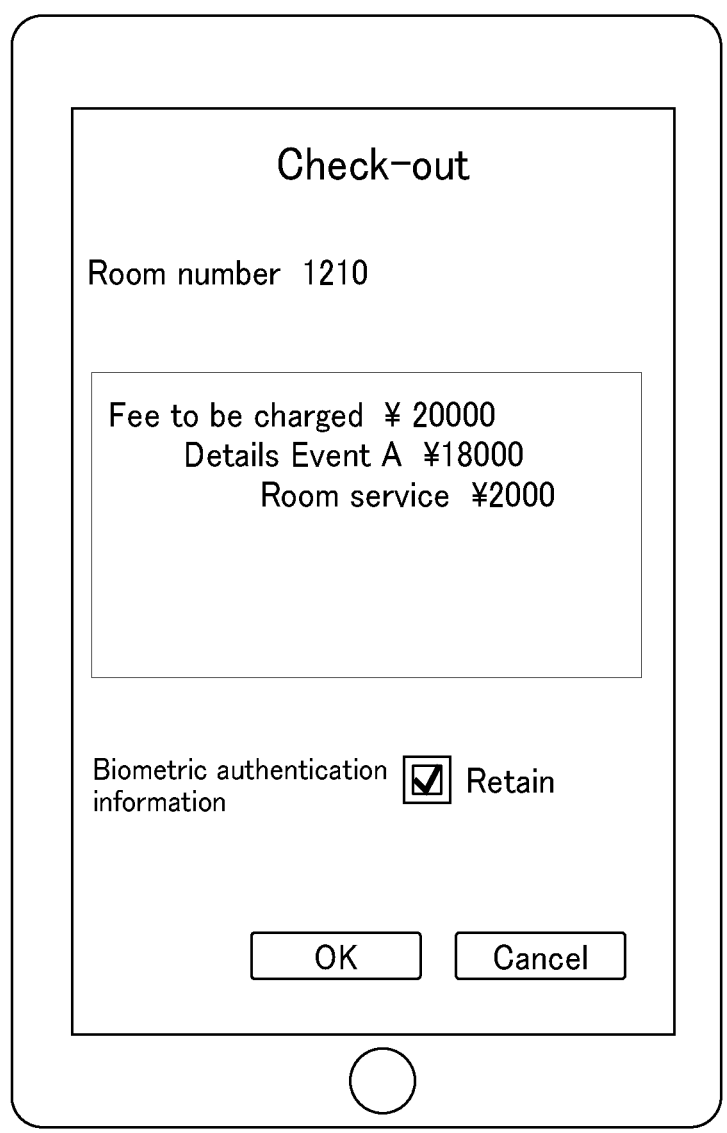
FIG. 12 is a diagram illustrating an example of a check-out screen.

FIG. 12 is an example of the check-out screen displayed by the display unit 321 of the application 320.

The service charge incurred due to use of the service by the user during the hotel stay is displayed on the check-out screen. Upon receiving an instruction to display the check-out screen through a user operation, the application 320 inquires about the details of the service that the user received during the hotel stay of the hotel service 310 via the communication unit 322.

The hotel service 310 acquires the details of the service that the user received from the service information management table (Table D) stored in the data storage unit 312 and transmits the details to the application 320. The application 320 calculates the sum of the amount of the service that the user received in the service information management table, for example, on the basis of the received details of the service, and displays the sum on the check-out screen as service charge. The user checks the details of the service that he or she received and the service charge on the check-out screen, and proceeds to a payment process at the front desk of the hotel.

Note that the check-out screen has a unit of selecting whether biometric authentication information is to be retained. The biometric authentication information is various kinds of information associated with biometric information. In the example illustrated in FIG. 12, whether biometric authentication information is to be retained can be selected in a check box. When the user selects retaining of his biometric authentication information, the process of registering the authenticator 330 in the server 102 (S403 to S408) can be skipped in the process of starting use of the hotel service 310 illustrated in FIG. 6 to be performed at his or her next stay.

When the user who selected retaining of his biometric authentication information stays at the same hotel next time, the user may input the user ID issued in the previous check-in and the password set before on the check-in screen of FIG. 9 during check-in. The user ID issued in Step S402 of FIG. 4 in the previous check-in can be used.

Accordingly, the registration processing unit 311 of the hotel service 310 performs collation of the user ID with existing user information with reference to the user information management table (Table B) and determines that the user ID is of the same person as the user of the record having the corresponding user ID and password h. Then, the registration processing unit 311 of the hotel service 310 determines whether there is a record having the user ID in the authenticator information management table (Table G).

When there is a record having the user ID, the registration processing unit 311 omits the processes of Steps S403 to S408 of FIG. 4. When the "OK" button on the check-out screen is pressed, an instruction to execute the process of ending use of the hotel service 310 (check-out process) is given to the application 320, and the execution of the process shown in FIG. 8 is started.

The description will now return to FIG. 8. In Step S601, upon receiving the instruction to execute the check-out process from the user, the application 320 transmits a check-out request to the hotel service 310. The request includes the selection result of whether his or her biometric authentication information is to be retained selected by the user on the check-out screen.

In the following Steps S602 and S603, registration information regarding the user of the mobile terminal 103 stored in the server 102 is updated. First, in Step S602, the registration processing unit 311 of the hotel service 310 cancels the association of the voice assistant 105 installed in the room where the user stayed with the authenticator 330 of the mobile terminal 103. That is, the record stored in the association information management table (Table E) in which the voice assistant 105 is associated with the authenticator ID for specifying the authenticator 330 is deleted.

In Step S603, it is selected not to retain the biometric authentication information on the check-out screen, the registration processing unit 311 deletes the following record. That is, corresponding records of the user in the attestation challenge management table (Table F) and the authenticator information management table (Table G) are deleted. Note that corresponding records of the user in the user information management table (Table B), the accommodation history management table (Table C), and the service information management table (Table D) are set to be retained without being deleted for the purpose of improving the service that may be provided next time when the user stays.

In Step S604, the registration processing unit 311 replies with information indicating that the check-out process has been completed to the application 320 of the mobile terminal 103. Note that the information indicating that the check-out process has been completed includes the selection result of whether the biometric authentication information is to be retained selected by the user on the check-out screen.

In Step S605, when it is selected not to retain the biometric authentication information, the application 320 requests that the record with respect to the hotel service 310 be deleted in the authentication information management table (Table A) from the authenticator 330. Upon receiving the request for record deletion from the application 320, the authenticator registration processing unit 331 of the authenticator 330 deletes the record. That is, the record with respect to the hotel service 310 is deleted in the authentication information management table (Table A) stored in the TPM 226 via the authentication information storage unit 333.

According to the present embodiment, a secure authentication method can be provided as described above, without registering biometric authentication information in a device disposed in a place used by many unspecified people.

Second Embodiment

In the first embodiment, various processes executed when a guest of a hotel uses service provided by the hotel, such as room service, using the voice assistant have been described. On the other hand, in the present embodiment, a case in which a guest uses service provided by an outside of a hotel, i.e., an external system different from the server 102, using the voice assistant will be described.

Note that, in the present embodiment, the same reference numerals are given to the same configurations of the devices and procedure of the various processes as those of the first embodiment, and description thereof will be omitted. In the present embodiment, a case in which a music distribution service 107 is used as an example of service provided other than a hotel will be described. The voice assistant 105 connects to the music distribution service 107 via the network 101. In addition, the mobile terminal 103 connects to the music distribution service 107 via the network 106.

Note that a user is assumed to make a contract with the music distribution service 107 in advance to receive the service with a voice assistant of his or her house and acquire an ID and a password from the service to register himself or herself as a user of the service. That is, the service is dedicated to authenticated users. In addition, the music distribution service 107 is assumed to support the authentication method, similarly to the hotel service 310 described in the first embodiment.

That is, the music distribution service 107 is assumed to have a mechanism in which biometric authentication is performed on a device at the hand of the user to authenticate the user and the service authenticates the user on the basis of the result. In addition, the user is assumed to register information associated with biometric authentication, for example, authentication identification information, a public key, and the like in the music distribution service 107 using the mobile terminal 103 in advance.

Figure 13:
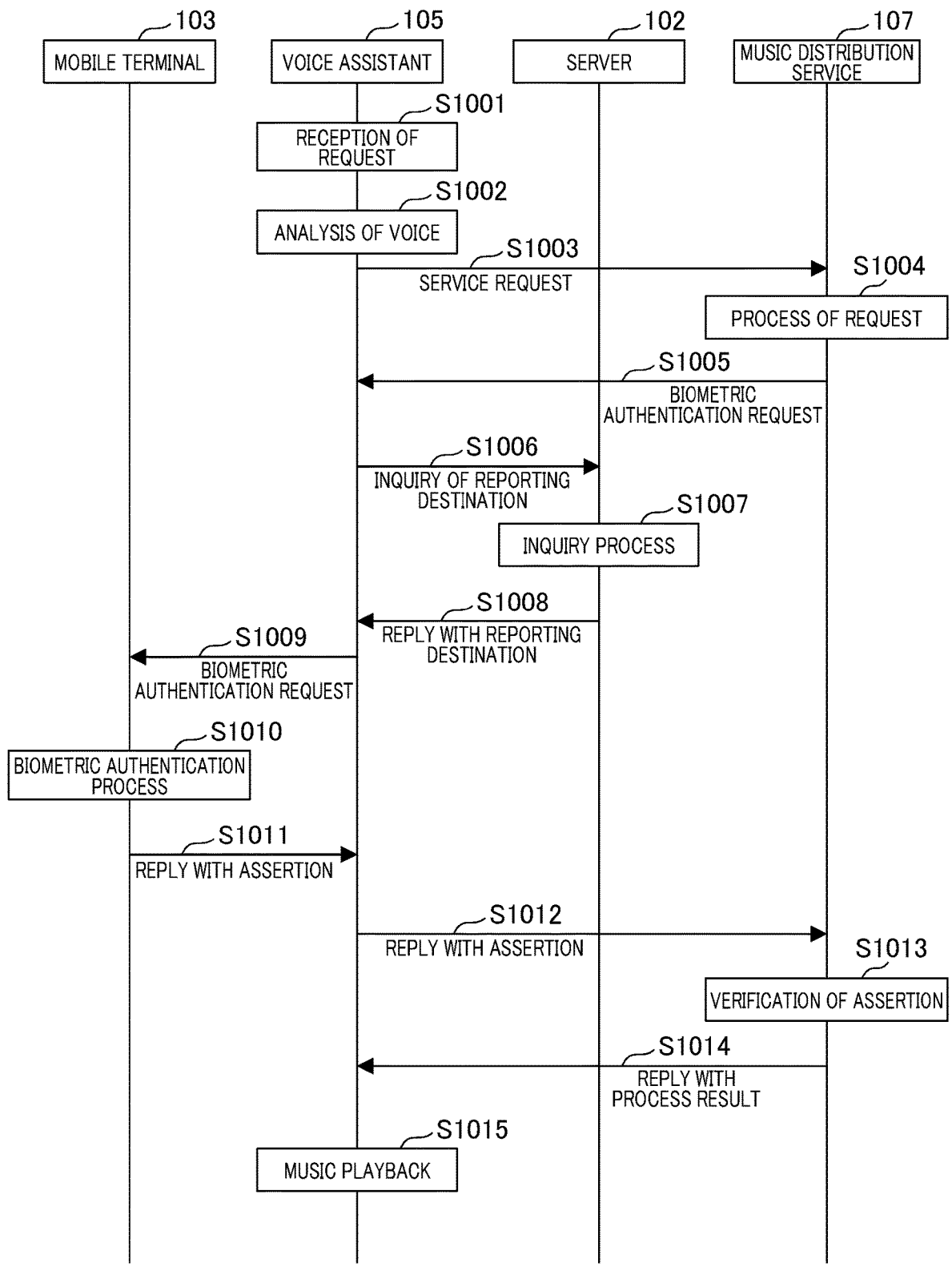
FIG. 13 is a sequence diagram illustrating a process performed to use a music distribution service.

FIG. 13 diagram for describing a process performed to use the music distribution service 107 via the voice assistant 105 in room where a guest (user) of a hotel stays.

The user makes a request for use of the music distribution service 107 to the voice assistant 105 through speed (voice). When music distribution is desired, for example, a request is made by speaking "play music in the music distribution service."

In Step S1001, the voice receiving unit 341 of the voice service 340 of the voice assistant 105 receives a request for provision of service from a user by voice. In Step S1002, the voice analysis unit 342 analyzes the received voice and determines details of the request. In Step S1003, the communication unit 345 transmits a process request analyzed in Step S1002 to the music distribution service 107.

Upon receiving the request from the voice assistant 105, the music distribution service 107 executes the process in accordance with the received request in Step S1004. Here, user authentication is assumed to be necessary when a service is provided in the music distribution service. Thus, in Step S1005, the music distribution service 107 makes a request for user authentication to the voice assistant 105.

Note that user authentication mentioned here is assumed to use the authentication mechanism (FIG. 7) used by the hotel service 310 in the first embodiment. Specifically, biometric authentication is performed on a device at the hand of the user and the user is authenticated on the basis of the result. That is, in Step S1005, the music distribution service 107 makes a biometric authentication request to the voice assistant 105.

Figure 7:
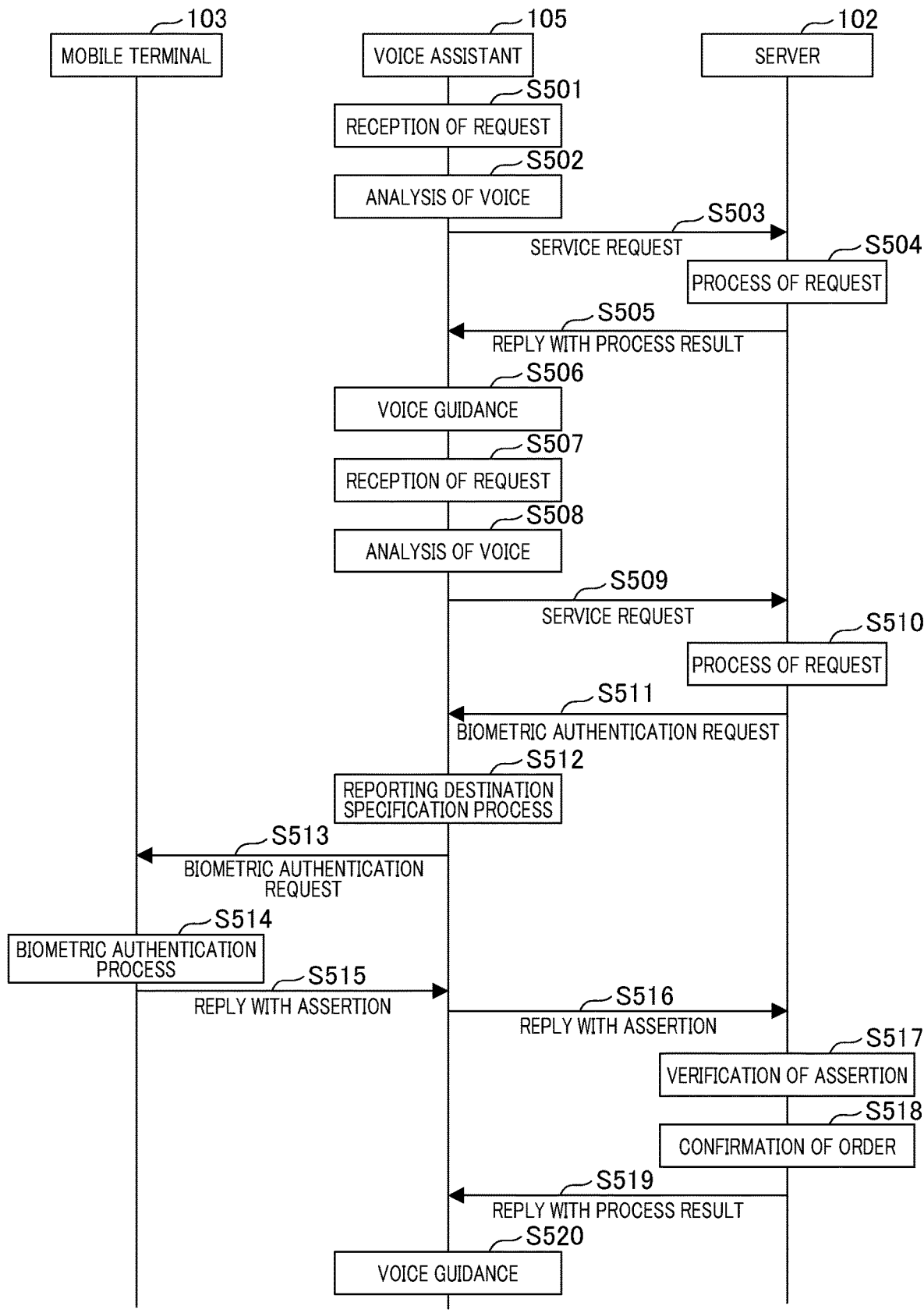
FIG. 7 is a sequence diagram illustrating a process performed for use of the service.

At this time, the music distribution service 107 includes a generated biometric authentication parameter in the request, as in the process of Step S511 of FIG. 7. In addition, the music distribution service 107 may include other information in the request. For example, any information such as promotion information or price guidance information may be included.

Note that, in Step S511 of FIG. 7, when the hotel service 310 transmits the request for user authentication, the authenticator ID for specifying the authenticator 330 associated with the voice assistant 105 is transmitted along with the biometric authentication parameter. However, since the music distribution service 107 does not retain information such as the association information management table (Table E), information corresponding thereto is not transmitted.

Therefore, in the present embodiment, the voice assistant 105 performs a process of specifying the authenticator 330 serving as a reporting destination of the biometric authentication request. In Step S1006, the biometric authentication control unit 344 of the voice service 340 inquires about the authenticator 330 of the mobile terminal 103 serving as a reporting destination of the biometric authentication request of the hotel service 310.

In Step S1007, the service processing unit 316 of the hotel service 310 specifies the authenticator 330 of the mobile terminal 103 associated with the voice assistant 105 serving as a requesting source in the association information management table (Table E). Then, in Step S1008, the service processing unit 316 replies with an authenticator ID indicating the authenticator 330 specified by the voice assistant 105.

In Step S1009, the biometric authentication control unit 344 of the voice service 340 specifies the authenticator 330 serving as a reporting destination of the biometric authentication request using the authenticator ID included in the result of request received in Step S1008. Then, the biometric authentication control unit 344 makes a biometric authentication request to the mobile terminal 103. Note that the biometric authentication request includes an auth-biometric authentication parameter described in the first embodiment.

Since a biometric authentication process executed in Steps S1010 to S1013 is the same as the process executed in Steps S514 to S517 of the first embodiment, description thereof will be omitted. When user authentication succeeds as a result of verification of assertion information executed in Step S1013, the music distribution service 107 starts provision of the service to the voice assistant 105 in Step S1014. That is, the music distribution service 107 distributes music data to the voice assistant 105.

On the other hand, when user authentication fails as a result of verification of the assertion information executed in Step S1013, the music distribution service 107 replies with information indicating the failure of user authentication to the voice assistant 105 and ends the process. Upon receiving the information indicating the failure of user authentication, the voice emission unit 343 of the voice service 340 reports the fact that the request received in Step S1001 has not been executed to the user by voice. In Step S1015, the voice emission unit 343 of the voice service 340 plays music in accordance with the provision of the service from the music distribution service 107.

Modified Example 1 of Second Embodiment

A modified example of the process (FIG. 13) of using the music distribution service with the voice assistant 105 in a room where a guest (user) of a hotel stays will be described using FIG. 14. In the process shown in FIG. 13, the request for the provision of the service is made to the music distribution service 107 via the voice assistant 105 (S1003).

Figure 14:
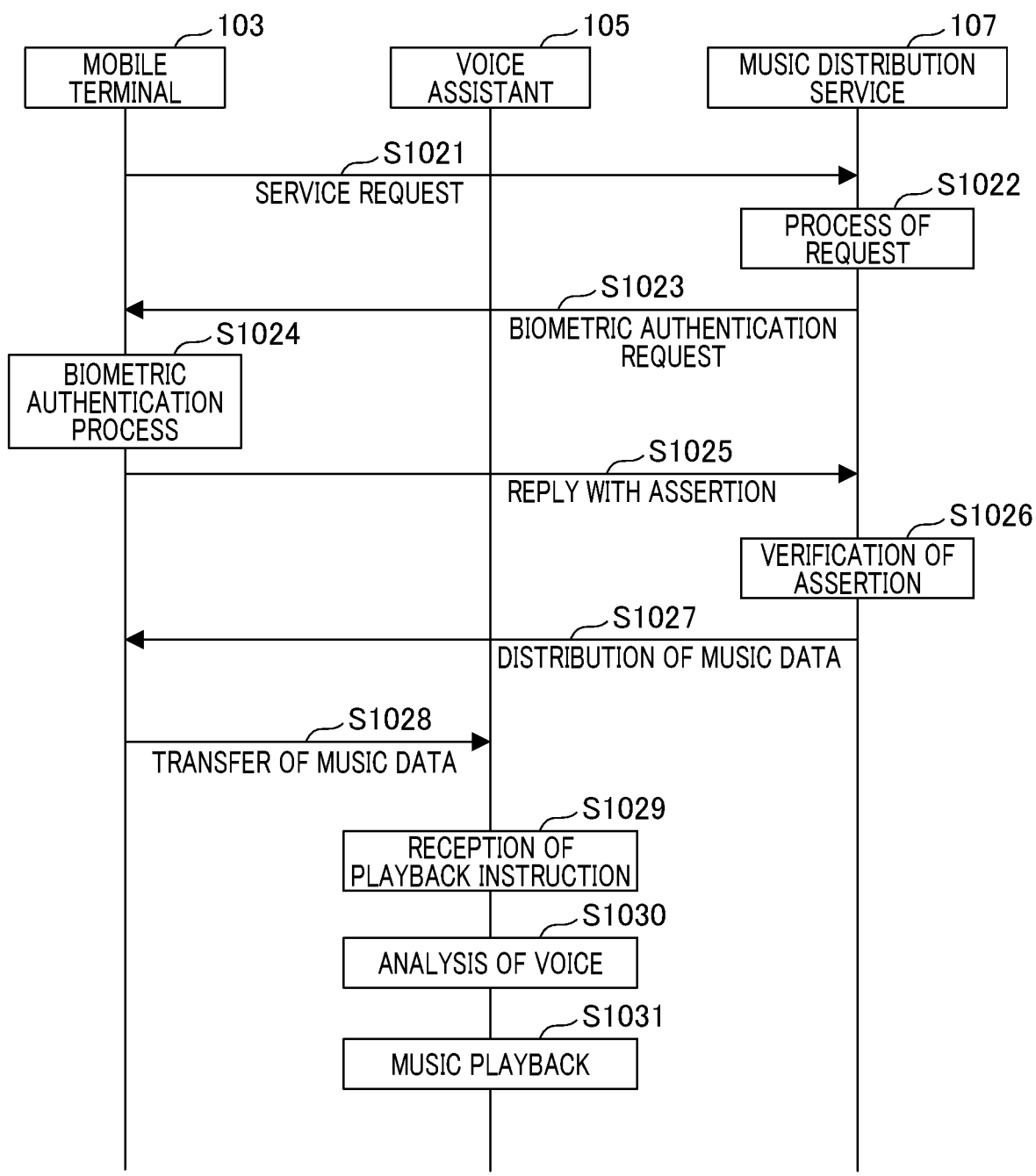
FIG. 14 is a sequence diagram illustrating a modified example of a process performed to use a music distribution service.

On the other hand, in the modified example illustrated in FIG. 14, the mobile terminal 103 makes a request directly to the music distribution service 107, without passing through the voice assistant 105. The request for the provision of the service is, for example, a request to specify the title of the music and acquire music data from the music distribution service 107 or the like.

Note that the mobile terminal 103 installs an application that is provided by the music distribution service 107 and cooperates with the music distribution service 107 and makes a request for provision of the service using the application. Alternatively, on the web browser of the mobile terminal 103, the URL of the web service provided by the music distribution service 107 may be designated and the request for the provision of the service may be made through a service screen for using the music distribution service 107. An application which is provided by the music distribution service 107 and cooperative with the music distribution service 107 will be referred to as a cooperative application below.

In Step S1021, the cooperative application of the mobile terminal 103 makes a request for the provision of the service to the music distribution service in accordance with an instruction from the user. In Step S1022, the music distribution service 107 receives a process request from the mobile terminal 103 and executes a process in accordance with the received request. Here, it is assumed that user authentication is necessary to receive the provision of the service from the music distribution service. Thus, in Step S1023, the music distribution service 107 makes a request for user authentication to the voice assistant 105.

Note that, for the user authentication mentioned here, the authentication mechanisms (FIG. 7 and FIG. 13) used by the hotel service 310 and the music distribution service 107 in the first and second embodiments are assumed to be used. Specifically, biometric authentication is performed on a device at the hand of the user and the user is authenticated on the basis of the result. That is, in Step S1023, the music distribution service 107 makes a biometric authentication request to the mobile terminal 103.

In Step S1024, the mobile terminal 103 executes a biometric authentication process. Note that, since the biometric authentication process is the same as those described in the first and second embodiments, description thereof is omitted. In Step S1025, the mobile terminal 103 replies with assertion information to the music distribution service 107. In Step S1026, the music distribution service 107 verifies the assertion information received in Step S1025.

When the user authentication succeeds as a result of the verification of the assertion information, the music distribution service 107 starts providing the service to the mobile terminal 103 in Step S1027. That is, the music distribution service 107 distributes music data requested in Step S1021 to the mobile terminal 103.

On the other hand, when the user authentication fails as a result of the verification of the assertion information, the music distribution service 107 replies with information indicating that the user authentication has failed to the mobile terminal 103, and ends the process. Upon receiving the information that the user authentication has failed, the mobile terminal 103 transfers music data to the voice assistant 105 installed in the room where the user of the mobile terminal 103 is staying in Step S1028. Then, the user makes a request to the voice assistant 105 through speech (voice). For example, the user specifies the title of the music transferred in Step S1028 and makes a request to play the music.

In Step S1029, the voice receiving unit 341 of the voice service 340 of the voice assistant 105 receives the voice request from the user. In Step S1030, the voice analysis unit 342 analyzes the received voice and determines details of the request. In Step S1031, the voice emission unit 343 plays the music in accordance with the analyzed details of the request.

Modified Example 2 of Second Embodiment

Figure 15:
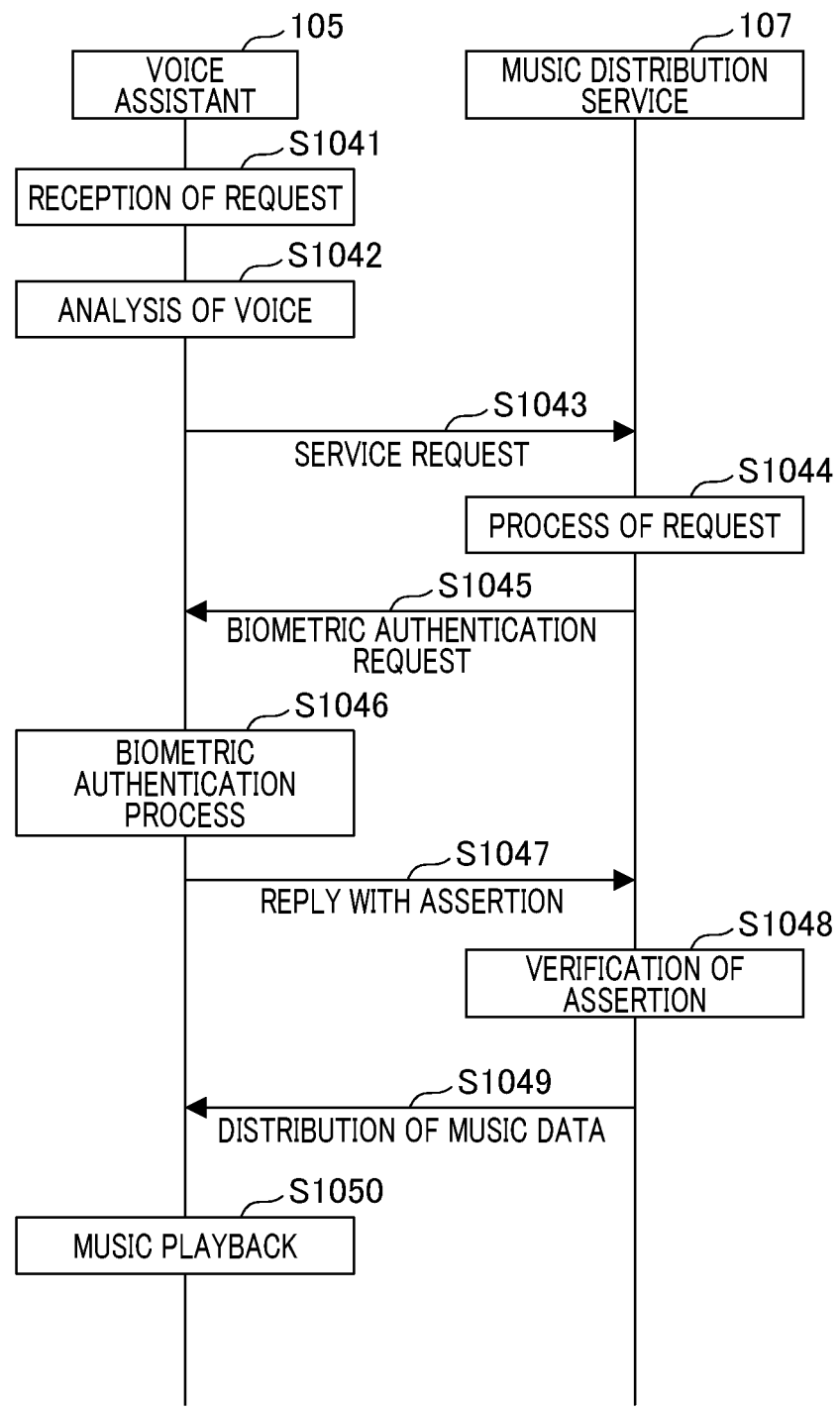
FIG. 15 is a sequence diagram illustrating a modified example of a process performed to use a music distribution service.

Another modified example of the process (FIG. 13) of using the music distribution service in a room where a guest (user) of a hotel stays through the voice assistant 105 will be described using FIG. 15. In the first embodiment, when the music distribution service 107 authenticates the user, biometric authentication is performed on the mobile terminal 103 serving as a device at the hand of the user and the user is authenticated on the basis of the result. On the other hand, in the modified example illustrated in FIG. 15, biometric authentication is performed on a voice operation device which is the voice assistant 105 serving as a device at the hand of the user.

Note that it is assumed that the music distribution service 107 and the hotel service 310 cooperate with each other and the guest can use the service of the music distribution service 107 in the hotel room. For example, it is assumed that music data is distributed from the music distribution service 107 to the voice assistant 105 and the voice assistant 105 can play the distributed music.

The music distribution service 107 checks details of a request for provision of the service from the cooperating voice assistant 105 of the hotel and whether the user who has made the request for the provision of the service is a legitimate guest, and then distributes music data to the voice assistant 105. At this time, user authentication is performed using the authentication mechanism implemented in the first or second embodiment. Specifically, biometric authentication is performed on the device at the hand of the user and the user is authenticated on the basis of the result.

However, a difference from the first and second embodiment is that the voice assistant 105 is used as a device at the hand of the user, rather than using the mobile terminal 103. Note that information for specifying the voice assistant 105 used within the hotel is registered (stored) in the music distribution service 107 in advance.

When checking in to the hotel, the user registers his or her biometric authentication information in the voice assistant 105. The registration of biometric authentication information is performed through the same process as the registration process (S403 to S408) of the authenticator 330 of the mobile terminal 103 with respect to the server 102 at the time of hotel check-in in the first embodiment.

In the present modified example, the voice assistant 105 has the authenticator 330 and the authenticator 330 of the voice assistant 105 executes the above-described processes from Steps S403 to S408, similarly to the mobile terminal 103. Accordingly, biometric information of the user is stored in the voice assistant 105. Note that the biometric information can be any type of information as in other embodiments. For example, the biometric information is assumed to be voiceprint information here. The guest (user) registers his or her voiceprint information in the voice assistant 105 by speaking to the voice assistant 105.

When the user wants to receive the provision of the service from the music distribution service 107, the user makes a request for the provision of the service to the voice assistant 105 by speed (voice). For example, the user specifies the title of the music and makes a request to play the music.

In Step S1041, the voice receiving unit 341 of the voice service 340 of the voice assistant 105 receives a voice request from the user. In Step S1042, the voice analysis unit 342 analyzes the received voice and determines details of the request. In Step S1043, the communication unit 345 transmits a process request analyzed in Step S1042 to the music distribution service 107.

Upon receiving the request from the voice assistant 105, the music distribution service 107 executes a process in accordance with the received request in Step S1044. In detail, first, the music distribution service 107 determines whether user authentication is necessary to execute the received request. Whether user authentication is necessary is assumed to be set in the music distribution service 107 in advance. For example, user authentication is determined to be unnecessary if the request is to acquire a music list and user authentication is determined to be necessary if the request is to play music.

Here, since what requested is to play music, the music distribution service 107 determines that user authentication is necessary. Thus, in Step S1045, the music distribution service 107 makes a request for user authentication, i.e., a biometric authentication request, to the voice assistant 105. At this time, the music distribution service 107 creates a biometric authentication parameter and includes the generated biometric authentication parameter in the request, as in the first embodiment. The biometric authentication parameter includes an assertion challenge that is verification data to be used for performing challenge response authentication as described above.

Upon receiving the biometric authentication request, the voice assistant 105 executes a biometric authentication process in Step S1046. In the biometric authentication process performed by the voice assistant 105, the voice emission unit 343 of the voice service 340 instructs the user to be subject to biometric authentication by voice and requests input of biometric information. For example, the voice emission unit 343 instructs the user saying that "voiceprint authentication will be performed, so please say something" by voice, and urges the user to input his or her biometric information.

Upon receiving voice from the user in Step S1046, the voice assistant 105 executes the biometric authentication process using the voiceprint information of the received voice. Note that the voice assistant 105 has the same function as the authenticator 330 of the mobile terminal 103 described in the first embodiment. Then, in Step S1046, the same process as the biometric authentication process (S514) executed by the mobile terminal 103 illustrated in FIG. 7 is performed in the voice assistant 105.

When the authentication succeeds as a result of the biometric authentication process of Step S1046, the voice assistant 105 replies with created assertion information to the music distribution service 107 in Step S1047. The assertion information includes a signature created by using a secret key stored in association with the biometric information as a result of the biometric authentication process and an assertion challenge included in the biometric authentication parameter received in Step S1045.

Note that, when the authentication fails as a result of the biometric authentication process of Step S1046 or when input of biometric information by the user is not performed for a certain period of time, the voice emission unit 343 of the voice service 340 reports that it is not possible to perform user authentication and the process ends to the user. Then, in Step S1047, information indicating that the result of the biometric authentication process is authentication failure is replied. Upon receiving the information indicating that the authentication has failed, the music distribution service 107 ends the process of FIG. 15.

In Step S1048, the music distribution service 107 verifies the assertion information received in Step S1047. Since the verification of the assertion is the same process as that executed by the hotel service 310 in S517 of FIG. 7 in the first embodiment, description thereof is omitted.

When the user authentication succeeds as a result of the verification of the assertion information executed in Step S1048, the music distribution service 107 starts providing the service to the voice assistant 105 in Step S1049. That is, the music distribution service 107 distributes music data to the voice assistant 105.

On the other hand, when the user authentication fails as a result of the verification of the assertion information executed in Step S1048, the music distribution service 107 replies with information indicating that the user authentication has failed to the voice assistant 105 and ends the process. Upon receiving the information indicating that the user authentication has failed, the voice emission unit 343 of the voice service 340 reports that the request received in Step S1041 has not been executed to the user by voice.

In Step S1050, the voice emission unit 343 of the voice service 340 plays the music in accordance with the provision of the service from the music distribution service 107. Note that, although the example in which biometric information is registered in the voice assistant 105 has been described in the present modified example, the present invention is not limited thereto. For example, the server 102 may have the authenticator 330 and the user's biometric information may be stored in the server 102.

In this case, when the voice assistant 105 receives voice from the user in Step S1046, voiceprint information of the received voice is transmitted to the hotel service 310. Then, the hotel service 310 transfers the received voiceprint information to its own authenticator, and a biometric authentication process is executed by the authenticator. A result of the biometric authentication process is replied from the hotel service 310 to the voice assistant 105.

In addition, the case in which the music distribution service 107 performs biometric authentication of the user as a method of user authentication has been described in the present modified example, the present invention is not limited thereto. For example, the method may be a method of using a keyword. In this case, a user sets an arbitrary keyword with respect to the voice assistant 105 at the time of check-in. The registration of the keyword is performed such that, for example, the user speaks the keyword by voice to the voice assistant 105.

The voice assistant 105 receives the request for user authentication from the music distribution service in Step S1045 and makes a request for the keyword registered at the time of check-in to the user. Upon receiving input of the keyword by voice of the user, the voice assistant 105 analyzes the voice, and when the input keyword matches the keyword set at the time of check-in, the voice assistant determines that the user authentication process succeeded.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-197216, filed Oct. 10, 2017, which is hereby incorporated by reference wherein in its entirety.

What is claimed is:

1. A system comprising an information processing terminal having an authentication module for biometric authentication and a storage unit with tamper resistance that stores biometric information of a user necessary when a biometric authentication process is performed using the authentication module, and a voice operation device that receives a voice input of a user and executes a process corresponding to the voice input, wherein the voice operation device comprises:
    a first memory storing instructions; and
    a first processor executing the instructions stored in the first memory causing the voice operation device to:
    make a process request corresponding to the voice input of the user to an external system, wherein payment by the user is necessary for a service related to the process request;
    receive a first authentication request from the external system;
    transmit, via wireless communication, a second authentication request to the information processing terminal of the user in accordance with the received first authentication request, wherein the second authentication request is different from the first authentication request and does not include any biometric information of the user necessary for performing the biometric authentication process but is configured to cause the information processing terminal to execute the biometric authentication process; and
    transmit an authentication result received from the information processing terminal to the external system as a response of the first authentication request, wherein the authentication result is verified by the external system before the service related to the process request corresponding to the voice input is provided, and
wherein the information processing terminal comprises:
a second memory storing instructions; and
a second processor executing the instructions stored in the second memory causing the information processing terminal to:
execute the biometric authentication process using the authentication module and the biometric information stored in the storage unit in accordance with the second authentication request from the voice operation device; and
transmit the authentication result of the biometric authentication process to the voice operation device.

2. The system according to claim 1, wherein the authentication result of the biometric authentication process includes a signature created by using a secret key stored in the storage unit in association with the biometric information and verification data issued by the external system in which a public key paired with the secret key is registered.

3. The system according to claim 1,
wherein the first authentication request received from the external system includes identification information for specifying the authentication module of the information processing terminal of the user who has performed the voice input to the voice operation device, and
wherein the instructions stored in the first memory cause the voice operation device to transmit the second authentication request to the information processing terminal having the authentication module specified on the basis of the identification information.

4. The system according to claim 1, wherein the instructions stored in the second memory cause the information processing terminal to display a screen related to reading biometric information using a biometric information sensor to register, in the external system, user registration information including a public key generated in association with the biometric information.

5. The system according to claim 4,
wherein the instructions stored in the second memory cause the information processing terminal to make a registration request for registration of the user registration information to the external system, and
wherein the external system manages the authentication module of the information processing terminal and the voice operation device used by the user of the information processing terminal in association with each other in accordance with the registration request from the information processing terminal.

6. The system according to claim 5,
wherein another authentication request received from another external system different from the external system does not include identification information for specifying the authentication module of the information processing terminal of the user who has performed the voice input to the voice operation device, and
wherein the instructions stored in the first memory cause the voice operation device to acquire the identification information of the authentication module of the information processing terminal associated with the voice operation device from the external system when the biometric authentication process is requested with respect to the information processing terminal.

7. The system according to claim 4,
wherein the instructions stored in the second memory cause the information processing terminal to make a cancellation request for registration cancellation of the user registration information to the external system, and
wherein the external system deletes the user registration information of a corresponding user in accordance with the cancellation request from the information processing terminal.

8. The system according to claim 1, wherein the instructions stored in the second memory cause the information processing terminal to display an authentication screen related to reading of biometric information using a biometric information sensor when the biometric authentication process is executed in accordance with the second authentication request from the voice operation device.

9. The system according to claim 1, wherein the instructions stored in the first memory cause the voice operation device to execute the service, which is provided from the external system to be dedicated to the authenticated user, in the voice operation device in accordance with success of verification of the authentication result.

10. A control method in a system comprising an information processing terminal having an authentication module for biometric authentication and a storage unit with tamper resistance that stores biometric information of a user necessary when a biometric authentication process is performed using the authentication module, and a voice operation device that receives a voice input of a user and executes a process corresponding to the voice input, the method comprising:
making, by the voice operation device, a process request corresponding to the voice input of the user to an external system, wherein payment by the user is necessary for a service related to the process request;
receiving, by the voice operation device, a first authentication request from the external system;
transmitting, by the voice operation device and via wireless communication, a second authentication request to the information processing terminal of the user in accordance with the received first authentication request, wherein the second authentication request is different from the first authentication request and does not include any biometric information of the user necessary for performing the biometric authentication process but is configured to cause the information processing terminal to execute the biometric authentication process;
executing, by the information processing terminal, the biometric authentication process using the authentication module and the biometric information stored in the storage unit in accordance with the second authentication request from the voice operation device;
transmitting, by the information processing terminal, an authentication result of the biometric authentication process to the voice operation device; and
transmitting, by the voice operation device, the authentication result received from the information processing terminal to the external system as a response of the first authentication request, wherein the authentication result is verified by the external system before the service related to the process request corresponding to the voice input is provided.

11. A voice operation device that receives a voice input of a user and executes a process corresponding to the voice input, the voice operation device comprising:
a memory storing instructions; and
a processor executing the instructions causing the voice operation device to:

make a process request corresponding to the voice input to an external system in accordance with the voice input, wherein payment by the user is necessary for a service related to the process request;

receive a first authentication request from the external system;

transmit, via wireless communication, a second authentication request to an information processing device, which is an information processing terminal of the user and has an authentication module for biometric authentication and a storage unit with tamper resistance that stores biometric information of the user necessary when a biometric authentication process is performed using the authentication module, in accordance with the received first authentication request, wherein the second authentication request is different from the first authentication request and does not include any biometric information of the user necessary for performing the biometric authentication process but is configured to cause the information processing terminal to execute the biometric authentication process; and transmit, to the external system as a response of the received first authentication request, an authentication result obtained from the information processing terminal by executing the biometric authentication process using the authentication module and the biometric information stored in the storage unit in accordance with the second authentication request, wherein the authentication result is verified by the external system before the service related to the process request corresponding to the voice input is provided.

12. A control method for a voice operation device that receives a voice input of a user and executes a process corresponding to the voice input, the method comprising:

making a process request corresponding to the voice input to an external system in accordance with the voice input, wherein payment by the user is necessary for a service related to the process request;

receiving a first authentication request from the external system;

transmitting, via wireless communication, a second authentication request to an information processing device, which is an information processing terminal of the user and has an authentication module for biometric authentication and a storage unit with tamper resistance that stores biometric information of the user necessary when a biometric authentication process is performed using the authentication module, in accordance with the received first authentication request, wherein the second authentication request is different from the first authentication request and does not include any biometric information of the user necessary for performing the biometric authentication process but is configured to cause the information processing terminal to execute the biometric authentication process; and transmitting, to the external system as a response of the received first authentication request, an authentication result obtained from the information processing terminal by executing the biometric authentication process using the authentication module and the biometric information stored in the storage unit in accordance with the second authentication request, wherein the authentication result is verified by the external system before the service related to the process request corresponding to the voice input is provided.

13. A non-transitory storage medium on which is stored a computer program for making a computer execute a method for a voice operation device that receives a voice input of a user and executes a process corresponding to the voice input, the method comprising:

making a process request corresponding to the voice input to an external system in accordance with the voice input, wherein payment by the user is necessary for a service related to the process request;

receiving a first authentication request from the external system;

transmitting, via wireless communication, a second authentication request to an information processing device, which is an information processing terminal of the user and has an authentication module for biometric authentication and a storage unit with tamper resistance that stores biometric information of the user necessary when a biometric authentication process is performed using the authentication module, in accordance with the received first authentication request, wherein the second authentication request is different from the first authentication request and does not include any biometric information of the user necessary for performing the biometric authentication process but is configured to cause the information processing terminal to execute the biometric authentication process; and transmitting, to the external system as a response of the received first authentication request, an authentication result obtained from the information processing terminal by executing the biometric authentication process using the authentication module and the biometric information stored in the storage unit in accordance with the second authentication request, wherein the authentication result is verified by the external system before the service related to the process request corresponding to the voice input is provided.

* * * * *